(12) United States Patent
Rowe

(10) Patent No.: US 8,913,800 B2
(45) Date of Patent: *Dec. 16, 2014

(54) OPTICAL BIOMETRICS IMAGING WITH FILMS

(75) Inventor: Robert K. Rowe, Corrales, NM (US)

(73) Assignee: Lumidigm, Inc., Albuquerque, NM (US)

( * ) Notice: Subject to any disclaimer, the term of this patent is extended or adjusted under 35 U.S.C. 154(b) by 77 days.

This patent is subject to a terminal disclaimer.

(21) Appl. No.: 13/482,850

(22) Filed: May 29, 2012

(65) Prior Publication Data

US 2012/0257033 A1 Oct. 11, 2012

Related U.S. Application Data

(63) Continuation of application No. 13/220,399, filed on Aug. 29, 2011, which is a continuation of application No. 12/557,406, filed on Sep. 10, 2009, now Pat. No. 8,165,357, which is a continuation of application No. 12/290,277, filed on Oct. 29, 2008, now Pat. No. 7,835,554, which is a continuation of application No. 11/115,100, filed on Apr. 25, 2005, now Pat. No. 7,460,696.

(60) Provisional application No. 60/576,364, filed on Jun. 1, 2004, provisional application No. 60/600,867, filed on Aug. 11, 2004, provisional application No. 60/610,802, filed on Sep. 17, 2004, provisional application No. 60/654,354, filed on Feb. 18, 2005, provisional application No. 60/659,024, filed on Mar. 4, 2005.

(51) Int. Cl.
*G06K 9/00* (2006.01)
*G06K 9/20* (2006.01)

(52) U.S. Cl.
CPC .......... *G06K 9/00046* (2013.01); *G06K 9/0012* (2013.01); *G06K 9/2018* (2013.01)

USPC .......................................................... 382/124

(58) Field of Classification Search
USPC .......................................................... 382/124
See application file for complete search history.

(56) References Cited

U.S. PATENT DOCUMENTS 3,508,830 A  4/1970  Hopkins et al.
3,619,060 A  11/1971  Johnson
(Continued)

FOREIGN PATENT DOCUMENTS

CN  1307711 A  8/2001
CN  1402183 A  3/2003
(Continued)

OTHER PUBLICATIONS

Rowe et al., Multispectral fingerprint image acquistion, Springerlink Oct. 6, 2006, entire document.*

(Continued)

*Primary Examiner* — John Strege
(74) *Attorney, Agent, or Firm* — Marsh Fischmann & Breyfogle LLP; Daniel J. Sherwinter

(57) ABSTRACT

Methods and systems are provided for performing a biometric measurement on an individual. A purported skin site of the individual is illuminated under a plurality of distinct optical conditions during a single illumination session. Light scattered beneath a surface of the purported skin site is received separately for each of the plurality of distinct optical conditions. A multispectral image of the purported skin site is derived from the received light. A biometric function is performed with the derived multispectral image.

20 Claims, 17 Drawing Sheets
(5 of 17 Drawing Sheet(s) Filed in Color)

(56) References Cited

U.S. PATENT DOCUMENTS

| | | | |
|---|---|---|---|
| 3,854,319 A | 12/1974 | Burroughs et al. |
| 3,872,443 A | 3/1975 | Ott |
| 3,910,701 A | 10/1975 | Henderson et al. |
| RE29,008 E | 10/1976 | Ott |
| 4,035,083 A | 7/1977 | Woodriff et al. |
| 4,142,797 A | 3/1979 | Astheimer |
| 4,169,676 A | 10/1979 | Kaiser |
| 4,170,987 A | 10/1979 | Anselmo et al. |
| 4,260,220 A | 4/1981 | Whitehead |
| 4,322,163 A | 3/1982 | Schiller |
| 4,322,164 A | 3/1982 | Shaw et al. |
| 4,427,889 A | 1/1984 | Muller |
| 4,537,484 A | 8/1985 | Fowler et al. |
| 4,598,715 A | 7/1986 | Machler et al. |
| 4,653,880 A | 3/1987 | Sting et al. |
| 4,654,530 A | 3/1987 | Dybwad |
| 4,655,225 A | 4/1987 | Dahne et al. |
| 4,656,562 A | 4/1987 | Sugino |
| 4,657,397 A | 4/1987 | Oehler et al. |
| 4,661,706 A | 4/1987 | Messerschmidt et al. |
| 4,684,255 A | 8/1987 | Ford |
| 4,699,149 A | 10/1987 | Rice |
| 4,712,912 A | 12/1987 | Messerschmidt |
| 4,730,882 A | 3/1988 | Messerschmidt |
| 4,747,147 A | 5/1988 | Sparrow |
| 4,787,013 A | 11/1988 | Sugino et al. |
| 4,787,708 A | 11/1988 | Whitehead |
| 4,830,496 A | 5/1989 | Young |
| 4,853,542 A | 8/1989 | Milosevic et al. |
| 4,857,735 A | 8/1989 | Noller |
| 4,859,064 A | 8/1989 | Messerschmidt et al. |
| 4,866,644 A | 9/1989 | Shenk et al. |
| 4,867,557 A | 9/1989 | Takatani et al. |
| 4,882,492 A | 11/1989 | Schlager |
| 4,883,953 A | 11/1989 | Koashi et al. |
| 4,936,680 A | 6/1990 | Henkes et al. |
| 4,937,764 A | 6/1990 | Komatsu et al. |
| 4,944,021 A | 7/1990 | Hoshino et al. |
| 4,975,581 A | 12/1990 | Robinson et al. |
| 5,015,100 A | 5/1991 | Doyle |
| 5,019,715 A | 5/1991 | Sting et al. |
| 5,028,787 A | 7/1991 | Rosenthal et al. |
| 5,051,602 A | 9/1991 | Sting et al. |
| 5,055,658 A | 10/1991 | Cockburn |
| 5,068,536 A | 11/1991 | Rosenthal |
| 5,070,874 A | 12/1991 | Barnes et al. |
| 5,077,803 A | 12/1991 | Kato et al. |
| 5,088,817 A | 2/1992 | Igaki et al. |
| 5,109,428 A | 4/1992 | Igaki et al. |
| 5,146,102 A | 9/1992 | Higuchi et al. |
| 5,158,082 A | 10/1992 | Jones |
| 5,166,517 A | 11/1992 | Volgyesi |
| 5,177,802 A | 1/1993 | Fujimoto et al. |
| 5,178,142 A | 1/1993 | Harjunmaa et al. |
| 5,179,951 A | 1/1993 | Knudson |
| 5,204,532 A | 4/1993 | Rosenthal |
| 5,222,495 A | 6/1993 | Clarke et al. |
| 5,222,496 A | 6/1993 | Clarke et al. |
| 5,223,715 A | 6/1993 | Taylor |
| 5,225,678 A | 7/1993 | Messerschmidt |
| 5,230,702 A | 7/1993 | Lindsay et al. |
| 5,237,178 A | 8/1993 | Rosenthal et al. |
| 5,243,546 A | 9/1993 | Maggard |
| 5,257,086 A | 10/1993 | Fateley et al. |
| 5,258,922 A | 11/1993 | Grill |
| 5,267,152 A | 11/1993 | Yang et al. |
| 5,268,749 A | 12/1993 | Weber et al. |
| 5,278,627 A | 1/1994 | Aoyagi et al. |
| 5,291,560 A | 3/1994 | Daugman |
| 5,299,570 A | 4/1994 | Hatschek |
| 5,303,026 A | 4/1994 | Strobl et al. |
| 5,311,021 A | 5/1994 | Messerschmidt |
| 5,313,941 A | 5/1994 | Braig et al. |
| 5,321,265 A | 6/1994 | Block |
| 5,331,958 A | 7/1994 | Oppenheimer |
| 5,335,288 A | 8/1994 | Faulkner |
| 5,348,003 A | 9/1994 | Caro |
| 5,351,686 A | 10/1994 | Steuer et al. |
| 5,355,880 A | 10/1994 | Thomas et al. |
| 5,360,004 A | 11/1994 | Purdy et al. |
| 5,361,758 A | 11/1994 | Hall et al. |
| 5,366,903 A | 11/1994 | Lundsgaard et al. |
| 5,372,135 A | 12/1994 | Mendelson et al. |
| 5,379,764 A | 1/1995 | Barnes et al. |
| 5,402,778 A | 4/1995 | Chance |
| 5,405,315 A | 4/1995 | Khuri et al. |
| 5,413,096 A | 5/1995 | Hart |
| 5,413,098 A | 5/1995 | Benaron |
| 5,419,321 A | 5/1995 | Evans |
| 5,435,309 A | 7/1995 | Thomas et al. |
| 5,441,053 A | 8/1995 | Lodder et al. |
| 5,452,723 A | 9/1995 | Wu et al. |
| 5,459,317 A | 10/1995 | Small et al. |
| 5,459,677 A | 10/1995 | Kowalski et al. |
| 5,460,177 A | 10/1995 | Purdy et al. |
| 5,483,335 A | 1/1996 | Tobias |
| 5,494,032 A | 2/1996 | Robinson et al. |
| 5,505,726 A | 4/1996 | Meserol |
| 5,507,723 A | 4/1996 | Keshaviah |
| 5,515,847 A | 5/1996 | Braig et al. |
| 5,518,623 A | 5/1996 | Keshaviah et al. |
| 5,523,054 A | 6/1996 | Switalski et al. |
| 5,533,509 A | 7/1996 | Koashi et al. |
| 5,537,208 A | 7/1996 | Bertram et al. |
| 5,539,207 A | 7/1996 | Wong |
| 5,552,997 A | 9/1996 | Massart |
| 5,559,504 A | 9/1996 | Itsumi et al. |
| 5,568,251 A | 10/1996 | Davies et al. |
| 5,596,992 A | 1/1997 | Haaland et al. |
| 5,606,164 A | 2/1997 | Price et al. |
| 5,613,014 A | 3/1997 | Eshera et al. |
| 5,630,413 A | 5/1997 | Thomas et al. |
| 5,636,633 A | 6/1997 | Messerschmidt et al. |
| 5,655,530 A | 8/1997 | Messerschmidt |
| 5,672,864 A | 9/1997 | Kaplan |
| 5,672,875 A | 9/1997 | Block et al. |
| 5,677,762 A | 10/1997 | Ortyn et al. |
| 5,681,273 A | 10/1997 | Brown |
| 5,708,593 A | 1/1998 | Saby et al. |
| 5,719,399 A | 2/1998 | Alfano et al. |
| 5,719,950 A | 2/1998 | Osten et al. |
| 5,724,268 A | 3/1998 | Sodickson et al. |
| 5,729,619 A | 3/1998 | Puma |
| 5,737,439 A | 4/1998 | Lapsley et al. |
| 5,743,262 A | 4/1998 | Lepper, Jr. et al. |
| 5,747,806 A | 5/1998 | Khalil et al. |
| 5,750,994 A | 5/1998 | Schlager |
| 5,751,835 A | 5/1998 | Topping et al. |
| 5,751,836 A | 5/1998 | Wildes et al. |
| 5,761,330 A | 6/1998 | Stoianov et al. |
| 5,782,755 A | 7/1998 | Chance et al. |
| 5,792,050 A | 8/1998 | Alam et al. |
| 5,792,053 A | 8/1998 | Skladnev et al. |
| 5,793,881 A | 8/1998 | Stiver et al. |
| 5,796,858 A | 8/1998 | Zhou et al. |
| 5,808,739 A | 9/1998 | Turner et al. |
| 5,818,048 A | 10/1998 | Sodickson et al. |
| 5,823,951 A | 10/1998 | Messerschmidt |
| 5,828,066 A | 10/1998 | Messerschmidt |
| 5,830,132 A | 11/1998 | Robinson |
| 5,830,133 A | 11/1998 | Osten et al. |
| 5,850,623 A | 12/1998 | Carman, Jr. et al. |
| 5,853,370 A | 12/1998 | Chance et al. |
| 5,857,462 A | 1/1999 | Thomas et al. |
| 5,859,420 A | 1/1999 | Borza |
| 5,860,421 A | 1/1999 | Eppstein et al. |
| 5,867,265 A | 2/1999 | Thomas |
| 5,886,347 A | 3/1999 | Inoue et al. |
| 5,902,033 A | 5/1999 | Levis et al. |
| 5,914,780 A | 6/1999 | Turner et al. |
| 5,929,443 A | 7/1999 | Alfano et al. |
| 5,933,792 A | 8/1999 | Andersen et al. |
| 5,935,062 A | 8/1999 | Messerschmidt et al. |
| 5,945,676 A | 8/1999 | Khalil et al. |

(56) References Cited

U.S. PATENT DOCUMENTS

| | | | |
|---|---|---|---|
| 5,949,543 A | 9/1999 | Bleier et al. |
| 5,957,841 A | 9/1999 | Maruo et al. |
| 5,961,449 A | 10/1999 | Toida et al. |
| 5,963,319 A | 10/1999 | Jarvis et al. |
| 5,978,495 A | 11/1999 | Thomopoulos et al. |
| 5,987,346 A | 11/1999 | Benaron et al. |
| 5,999,637 A | 12/1999 | Toyoda et al. |
| 6,005,722 A | 12/1999 | Butterworth et al. |
| 6,016,435 A | 1/2000 | Maruo et al. |
| 6,025,597 A | 2/2000 | Sterling et al. |
| 6,026,314 A | 2/2000 | Amerov et al. |
| 6,028,773 A | 2/2000 | Hundt |
| 6,031,609 A | 2/2000 | Funk et al. |
| 6,034,370 A | 3/2000 | Messerschmidt |
| 6,040,578 A | 3/2000 | Malin et al. |
| 6,041,247 A | 3/2000 | Weckstrom et al. |
| 6,041,410 A | 3/2000 | Hsu et al. |
| 6,043,492 A | 3/2000 | Lee et al. |
| 6,044,285 A | 3/2000 | Chaiken et al. |
| 6,045,502 A | 4/2000 | Eppstein et al. |
| 6,046,808 A | 4/2000 | Fateley |
| 6,049,727 A | 4/2000 | Crothall |
| 6,056,738 A | 5/2000 | Marchitto et al. |
| 6,057,925 A | 5/2000 | Anthon |
| 6,061,581 A | 5/2000 | Alam et al. |
| 6,061,582 A | 5/2000 | Small et al. |
| 6,066,847 A | 5/2000 | Rosenthal |
| 6,069,689 A | 5/2000 | Zeng et al. |
| 6,070,093 A | 5/2000 | Oosta et al. |
| 6,073,037 A | 6/2000 | Alam et al. |
| 6,081,612 A | 6/2000 | Gutkowicz-Krusin et al. |
| 6,088,605 A | 7/2000 | Griffith et al. |
| 6,088,607 A | 7/2000 | Diab et al. |
| 6,097,035 A | 8/2000 | Belongie et al. |
| 6,100,811 A | 8/2000 | Hsu et al. |
| 6,115,484 A | 9/2000 | Bowker et al. |
| 6,115,673 A | 9/2000 | Malin et al. |
| 6,122,042 A | 9/2000 | Wunderman et al. |
| 6,122,394 A | 9/2000 | Neukermans et al. |
| 6,122,737 A | 9/2000 | Bjorn et al. |
| 6,125,192 A | 9/2000 | Bjorn et al. |
| 6,141,101 A | 10/2000 | Bleier et al. |
| 6,147,749 A | 11/2000 | Kubo et al. |
| 6,148,094 A | 11/2000 | Kinsella |
| 6,152,876 A | 11/2000 | Robinson et al. |
| 6,154,658 A | 11/2000 | Caci |
| 6,157,041 A | 12/2000 | Thomas et al. |
| 6,159,147 A | 12/2000 | Lichter et al. |
| 6,172,743 B1 | 1/2001 | Kley et al. |
| 6,175,407 B1 | 1/2001 | Sartor |
| 6,181,414 B1 | 1/2001 | Raz et al. |
| 6,181,958 B1 | 1/2001 | Steuer et al. |
| 6,188,781 B1 | 2/2001 | Brownlee |
| 6,193,153 B1 | 2/2001 | Lambert |
| 6,208,749 B1 | 3/2001 | Gutkowicz-Krusin et al. |
| 6,212,424 B1 | 4/2001 | Robinson |
| 6,226,541 B1 | 5/2001 | Eppstein et al. |
| 6,229,908 B1 | 5/2001 | Edmonds, III et al. |
| 6,230,034 B1 | 5/2001 | Messerschmidt et al. |
| 6,236,047 B1 | 5/2001 | Malin et al. |
| 6,240,306 B1 | 5/2001 | Rohrscheib et al. |
| 6,240,309 B1 | 5/2001 | Yamashita et al. |
| 6,241,663 B1 | 6/2001 | Wu et al. |
| 6,256,523 B1 | 7/2001 | Diab et al. |
| 6,272,367 B1 | 8/2001 | Chance |
| 6,280,381 B1 | 8/2001 | Malin et al. |
| 6,282,303 B1 | 8/2001 | Brownlee |
| 6,285,895 B1 | 9/2001 | Ristolainen et al. |
| 6,292,576 B1 * | 9/2001 | Brownlee ............ 382/124 |
| 6,301,375 B1 | 10/2001 | Choi |
| 6,301,815 B1 | 10/2001 | Sliwa |
| 6,304,767 B1 | 10/2001 | Soller et al. |
| 6,307,633 B1 | 10/2001 | Mandella et al. |
| 6,309,884 B1 | 10/2001 | Cooper et al. |
| 6,317,507 B1 | 11/2001 | Dolfing |
| 6,324,310 B1 | 11/2001 | Brownlee |
| 6,330,346 B1 | 12/2001 | Peterson et al. |
| 6,404,904 B1 | 6/2002 | Einighammer et al. |
| 6,419,361 B2 | 7/2002 | Cabib et al. |
| 6,483,929 B1 | 11/2002 | Murakami et al. |
| 6,504,614 B1 | 1/2003 | Messerschmidt et al. |
| 6,537,225 B1 | 3/2003 | Mills |
| 6,560,352 B2 | 5/2003 | Rowe et al. |
| 6,574,490 B2 | 6/2003 | Abbink et al. |
| 6,597,945 B2 | 7/2003 | Marksteiner |
| 6,606,509 B2 | 8/2003 | Schmitt |
| 6,628,809 B1 | 9/2003 | Rowe et al. |
| 6,631,199 B1 | 10/2003 | Topping et al. |
| 6,741,729 B2 | 5/2004 | Bjorn et al. |
| 6,749,115 B2 | 6/2004 | Gressel et al. |
| 6,799,275 B1 | 9/2004 | Bjorn |
| 6,799,726 B2 | 10/2004 | Stockhammer |
| 6,816,605 B2 | 11/2004 | Rowe et al. |
| 6,825,930 B2 | 11/2004 | Cronin et al. |
| 6,853,444 B2 | 2/2005 | Haddad |
| 6,898,299 B1 | 5/2005 | Brooks |
| 6,928,181 B2 | 8/2005 | Brooks |
| 6,937,885 B1 | 8/2005 | Lewis et al. |
| 6,958,194 B1 | 10/2005 | Hopper et al. |
| 6,995,384 B2 | 2/2006 | Lee et al. |
| 7,047,419 B2 | 5/2006 | Black |
| 7,147,153 B2 * | 12/2006 | Rowe et al. ............ 235/382 |
| 7,254,255 B2 | 8/2007 | Dennis |
| 7,263,213 B2 | 8/2007 | Rowe |
| 7,287,013 B2 | 10/2007 | Schneider et al. |
| 7,347,365 B2 | 3/2008 | Rowe |
| 7,366,331 B2 | 4/2008 | Higuchi |
| 7,386,152 B2 | 6/2008 | Rowe et al. |
| 7,394,919 B2 * | 7/2008 | Rowe et al. ............ 382/127 |
| 7,397,943 B2 | 7/2008 | Merbach et al. |
| 7,440,597 B2 * | 10/2008 | Rowe .................... 382/124 |
| 7,460,696 B2 * | 12/2008 | Rowe .................... 382/124 |
| 7,508,965 B2 | 3/2009 | Rowe et al. |
| 7,515,252 B2 | 4/2009 | Hernandez |
| 7,539,330 B2 * | 5/2009 | Rowe .................... 382/124 |
| 7,545,963 B2 | 6/2009 | Rowe |
| 7,627,151 B2 | 12/2009 | Rowe |
| 7,668,350 B2 | 2/2010 | Rowe |
| 7,735,729 B2 | 6/2010 | Rowe |
| 7,751,594 B2 | 7/2010 | Rowe et al. |
| 7,801,338 B2 * | 9/2010 | Rowe .................... 382/124 |
| 7,801,339 B2 | 9/2010 | Sidlauskas et al. |
| 7,804,984 B2 | 9/2010 | Sidlauskas et al. |
| 7,819,311 B2 * | 10/2010 | Rowe et al. ............ 235/382 |
| 7,831,072 B2 | 11/2010 | Rowe |
| 7,835,554 B2 | 11/2010 | Rowe |
| 7,899,217 B2 | 3/2011 | Uladag et al. |
| 7,995,808 B2 | 8/2011 | Rowe et al. |
| 8,229,185 B2 * | 7/2012 | Ennis et al. ............ 382/124 |
| 2002/0009213 A1 | 1/2002 | Rowe et al. |
| 2002/0065468 A1 | 5/2002 | Utzinger et al. |
| 2002/0101566 A1 | 8/2002 | Elsner et al. |
| 2002/0138768 A1 | 9/2002 | Murakami et al. |
| 2002/0171834 A1 | 11/2002 | Rowe et al. |
| 2002/0183624 A1 | 12/2002 | Rowe et al. |
| 2003/0012416 A1 * | 1/2003 | Ryabov et al. ............ 382/124 |
| 2003/0025897 A1 | 2/2003 | Iwai |
| 2003/0044051 A1 | 3/2003 | Fujieda |
| 2003/0078504 A1 | 4/2003 | Rowe |
| 2003/0128867 A1 | 7/2003 | Bennett |
| 2003/0163710 A1 | 8/2003 | Ortiz et al. |
| 2003/0223621 A1 | 12/2003 | Rowe et al. |
| 2004/0003295 A1 | 1/2004 | Elderfield et al. |
| 2004/0008875 A1 | 1/2004 | Linares |
| 2004/0022421 A1 | 2/2004 | Endoh et al. |
| 2004/0042642 A1 | 3/2004 | Bolle et al. |
| 2004/0047493 A1 | 3/2004 | Rowe et al. |
| 2004/0068394 A1 | 4/2004 | Maekawa et al. |
| 2004/0114783 A1 | 6/2004 | Spycher et al. |
| 2004/0120553 A1 | 6/2004 | Stobbe |
| 2004/0125994 A1 | 7/2004 | Engels et al. |
| 2004/0179722 A1 | 9/2004 | Moritoki et al. |
| 2004/0240712 A1 | 12/2004 | Rowe et al. |
| 2004/0240713 A1 | 12/2004 | Hata |

(56) References Cited

U.S. PATENT DOCUMENTS

| | | |
|---|---|---|
| 2004/0264742 A1 | 12/2004 | Zhang et al. |
| 2005/0007582 A1 | 1/2005 | Villers et al. |
| 2005/0125339 A1 | 6/2005 | Tidwell et al. |
| 2005/0169504 A1 | 8/2005 | Black |
| 2005/0180620 A1 | 8/2005 | Takiguchi |
| 2005/0185847 A1 | 8/2005 | Rowe |
| 2005/0205667 A1 | 9/2005 | Rowe |
| 2005/0265585 A1 | 12/2005 | Rowe |
| 2005/0265586 A1 | 12/2005 | Rowe et al. |
| 2005/0265607 A1 | 12/2005 | Chang |
| 2005/0271258 A1 | 12/2005 | Rowe |
| 2006/0002597 A1 | 1/2006 | Rowe |
| 2006/0002598 A1 | 1/2006 | Rowe et al. |
| 2006/0062438 A1 | 3/2006 | Rowe |
| 2006/0110015 A1 | 5/2006 | Rowe |
| 2006/0115128 A1 | 6/2006 | Mainguet |
| 2006/0171571 A1 | 8/2006 | Chan et al. |
| 2006/0202028 A1 | 9/2006 | Rowe et al. |
| 2006/0210120 A1 | 9/2006 | Rowe et al. |
| 2006/0244947 A1 | 11/2006 | Rowe |
| 2006/0274921 A1 | 12/2006 | Rowe |
| 2007/0014437 A1 | 1/2007 | Sato |
| 2007/0030475 A1 | 2/2007 | Rowe et al. |
| 2007/0052827 A1 | 3/2007 | Hiltunen |
| 2007/0116331 A1 | 5/2007 | Rowe et al. |
| 2007/0153258 A1 | 7/2007 | Hernandez |
| 2007/0165903 A1 | 7/2007 | Munro et al. |
| 2008/0008359 A1 | 1/2008 | Beenau et al. |
| 2008/0013806 A1 | 1/2008 | Hamid |
| 2008/0025579 A1 | 1/2008 | Sidlauskas et al. |
| 2008/0025580 A1 | 1/2008 | Sidlauskas et al. |
| 2008/0192998 A1 | 8/2008 | Takeguchi et al. |
| 2008/0232653 A1 | 9/2008 | Rowe |
| 2008/0260211 A1 | 10/2008 | Bennett et al. |
| 2008/0298649 A1 | 12/2008 | Ennis et al. |
| 2009/0046903 A1 | 2/2009 | Corcoran et al. |
| 2009/0080709 A1 | 3/2009 | Rowe et al. |
| 2009/0092290 A1 | 4/2009 | Rowe |
| 2009/0148005 A1 | 6/2009 | Rowe |
| 2009/0245591 A1 | 10/2009 | Rowe et al. |
| 2010/0246902 A1 | 9/2010 | Rowe et al. |
| 2011/0085708 A1 | 4/2011 | Martin et al. |

FOREIGN PATENT DOCUMENTS

| | | |
|---|---|---|
| CN | 1509454 A | 6/2004 |
| DE | 10153808 A1 | 5/2003 |
| EP | 0280418 A1 | 8/1988 |
| EP | 0372748 A2 | 6/1990 |
| EP | 0897164 A2 | 2/1999 |
| EP | 0924656 A2 | 6/1999 |
| EP | 1353292 A1 | 10/2003 |
| EP | 1434162 A2 | 6/2004 |
| FR | 2761180 A1 | 9/1998 |
| GB | 2280024 A | 1/1995 |
| JP | 61182174 A | 8/1986 |
| JP | 03-016160 | 1/1991 |
| JP | 7075629 A | 3/1995 |
| JP | 10-127585 | 5/1998 |
| JP | 2001033381 A | 2/2001 |
| JP | 2001-112742 | 4/2001 |
| JP | 2001184490 A | 7/2001 |
| JP | 2002133402 A | 5/2002 |
| JP | 2003050993 A | 2/2003 |
| JP | 2003308520 A | 10/2003 |
| WO | 92/00513 A1 | 1/1992 |
| WO | 92/17765 A1 | 10/1992 |
| WO | 93/07801 A1 | 4/1993 |
| WO | 93/13706 A2 | 7/1993 |
| WO | 99/27848 A1 | 6/1999 |
| WO | 00/30530 A1 | 6/2000 |
| WO | 00/46739 A1 | 8/2000 |
| WO | 01/15596 A1 | 3/2001 |
| WO | 01/18332 A1 | 3/2001 |
| WO | 01/27882 A2 | 4/2001 |
| WO | 01/52180 A1 | 7/2001 |
| WO | 01/52726 A1 | 7/2001 |
| WO | 01/53805 A1 | 7/2001 |
| WO | 01/65471 A1 | 9/2001 |
| WO | 02/084605 A2 | 10/2002 |
| WO | 02/099393 A2 | 12/2002 |
| WO | 03/096272 A1 | 11/2003 |
| WO | 2004/068388 A2 | 8/2004 |
| WO | 2004/068394 A1 | 8/2004 |
| WO | 2004/090786 A3 | 10/2004 |
| WO | 2006049394 A1 | 5/2006 |
| WO | 2006/077446 A2 | 7/2006 |
| WO | 2006/093508 A3 | 9/2006 |
| WO | 2008/154589 A3 | 12/2008 |

OTHER PUBLICATIONS

Anderson, C.E. et al. "Fundamentals of Calibration Transfer Through Procrustes Analysis". Appln. Spectros. vol. 53, No. 10. pp. 1268-1276, 1999.

Ashbourn, Julian. "Biometrics; Advanced Identity Verification". Springer. pp. 63-64, 2000.

Bantle, John P. et al. "Glucose Measurement in Patients With Diabetes Mellitus With Dermal Interstitial Fluid". Mosby-Year Book, Inc. 9 pages. 1997.

Berkoben et al. "Vascular Access for Hemodialysis". Clinical Dialysis, 20 pages, published on or before Oct. 30, 1997.

Blank, T.B. et al. "Transfer of Near-Infrared Multivariate Calibrations Without Standards". Anal. Chem. vol. 68, p. 2987. 1996.

Bleyer et al. "The Costs of Hospitalizations Due to Hemodialysis Access Management". Nephrology News & Issues. pp. 19,20,22. Jan. 1995.

Brasunas, John C. et al. "Uniform Time-Sampling Fourier Transform Spectroscopy". Applied Optics. vol. 36, No. 10. pp. 2206-2210. Apr. 1, 1997.

Brault, James W. "New Approach to High-Precision Fourier Transform Spectrometer Design". Applied Optics. vol. 35, No. 16. pp. 2891-2896. Jun. 1, 1996.

Cassarly, W.J. et al. "Distributed Lighting Systems: Uniform Light Delivery". Source unknown. pp. 1698-1702.

Chang, Chong-Min et al. "A Uniform Rectangular Illuminating Optical System for Liquid Crystal Light Valve Projectors". Euro Display '96. pp. 257-260. 1996.

Coyne, Lawrence J. et al. "Distributive Fiber Optic Couplers Using Rectangular Lightguides As Missing Elements". Information Gatekeepers, Inc. Brookline, MA. pp. 160-164. 1979.

Daugirdas et al. "Comparison of Methods to Predict the Equilibrated Kt/V (eKt/V) in The Hemo Study". National Institutes of Health, NIDDK, Bethesda, MD. Aug. 20, 1996.

De Noord, Onno E. "Multivariate Calibration Standardization". Chemometrics and Intelligent Laboratory Systems 25. pp. 85-97. 1994.

Demos, S.G. et al. "Optical Fingerprinting Using Polarisation Contrast Improvement". Electronics Letters. vol. 33, No. 7. pp. 582-584. Mar. 27, 1997.

Depner et al. "Clinical Measurement of Blood Flow in Hemodialysis Access Fistulae and Grafts by Ultrasound Dilution". Department of Nephrology, University of California. 4 pages. Published on or before Oct. 30, 1997.

Despain, Alvin M. et al. "A Large-Aperture Field-Widened Interferometer-Spectrometer for Airglow Studies". Aspen International Conference on Fourier Spectroscopy. pp. 293-300. 1970.

Faber, Nicolaas. "Multivariate Sensitivity for the Interpretation of the Effect of Spectral Pretreatment Methods on Near-Infrared Calibration Model Predictions". Analytical Chemistry. vol. 71, No. 3. pp. 557-565. Feb. 1, 1999.

Fresenius USA. "Determination of Delivered Therapy Through Measurement of Effective Clearance". 1 page. Dec. 1994.

Geladi, Paul et al. "A Multivariate NIR Study of Skin Alterations in Diabetic Patients As Compared to Control Subjects". Near Infrared Spectros. vol. 8. pp. 217-227, 2000.

(56) References Cited

OTHER PUBLICATIONS

Hakim et al. "Effects of Dose of Dialysis on Morbidity and Mortality". American Journal of Kidney Diseases. vol. 23, No. 5. pp. 661-669. May 1994.

In Line Diagnostics. "Improve The Clinical Outcome of Every Patient". 2 pages. Published on or before Oct. 30, 1997.

Jacobs et al. "A Disposable Urea Sensor for Continuous Monitoring of Hemodialysis Efficiency". USAIO Journal. pp. M353-M358m. 1993.

Keshaviah et al. "On-Line Monitoring of the Delivery of The Hemodialysis Prescription". Pediatric Nephrology. vol. 9. pp. S2-S8. 1995.

Krivitski. "Theory and Validation of Access Flow Measurement by Dilution Technique During Hemodialysis". Kidney International. vol. 48. pp. 244-250. 1995.

Lee et al. "Fingerprint Recognition Using Principal Gabor Basis Function". Proceedings of 2001 International Symposium on Intelligent Multimedia, Video and Speech Processing. Sections 2-3. May 2-4, 2001.

Marbach, Ralf. "Measurement Techniques for IR Spectroscopic Blood Glucose Determination". pp. 1-158. 2005.

Mardia, K.V. et al. "Multivariate Analysis". Academic Press. pp. 300-325. 1979.

Nichols et al. "Designe and Testing of a White-Light, Steady-State Diffuse Reflectance Spectrometer for Determination of Optical Properties of Highly Scattering Systems". Applied Optics. vol. 36, No. 1. pp. 93-104. Jan. 1, 1967.

Nixon, Kristin A. et al. "Novel Spectroscopy-Based Technology for Biometric and Liveness Verification". Biometric Technology for Human Identification. Proceedings of SPIE. vol. 5404, No. 1. pp. 287-295. Apr. 12-13, 2004.

Pan et al. "Face Recognition in Hyperspectral Images". IEEE Transactions on Pattern Analysis and Machine Intelligence. vol. 25, No. 12. Dec. 2003.

Ripley, B.D. "Pattern Recognition and Neural Networks". Cambridge University Press. pp. 91-120. 1996.

Ronco et al. "On-Line Urea Monitoring: A Further Step Towards Adequate Dialysis Prescription and Delivery". Int'l Journal of Artifical Organs. vol. 18, No. 9. pp. 534-543. 1995.

Ross et al. "A Hybrid Fingerprint Matcher". Pattern Recognition 36. The Journal of the Pattern Recognition Society. 2003 Elesvier Science Ltd. pp. 1661-1673. 2003.

Selvaraj et al. "Fingerprint Verification Using Wavelet Transform". Proceedings of the Fifth International Conference on Computational Intelligence and Multimedia Applications, IEEE. 2003.

Service, F. John et al. "Dermal Interstitial Glucose as an Indicator of Ambient Glycemia". Diabetes Care. vol. 20, No. 9. 9 pages. Sep. 1997.

Sherman. "Recirculation in The Hemodialysis Access". Principles and Practice of Dialysis. pp. 38-46. 1994.

Sherman. "The Measurement of Dialysis Access Recirculation". American Journal of Kidney Diseases. vol. 22, No. 4. pp. 616-621. Oct. 1993.

Steuer et al. "A New Optical Technique for Monitoring Hematocrit and Circulating Blood Volume: Its Application in Renal Dialysis". Dialysis & Transplantation. vol. 22, No. 5. pp. 260-265. May 1993.

Webb, Paul. "Temperatures of Skin, Subcutaneous Tissue, Muscle and Core in Resting Men in Cold, Conforable and Hot Conditions". European Journal of Applied Physiology. vol. 64. pp. 471-476. 1992.

Zavala, Albert et al. "Using Fingerprint Measures to Predict Other Anthropometric Variables". Human Factors. vol. 17, No. 6. pp. 591-602. 1975.

Maltoni et al. "Handbook of Fingerprint Recognition," 2005, pp. 58-61.

Chinese Patent Application No. 2006/80038579.4, First Office Action mailed on Mar. 23, 2011. 7 pages.

European Patent Application No. 10166537.0. Extended European Search Report mailed on Jun. 1, 2011. 7 pages.

International Search Report and Written Opinion of PCT/US2008/066585 mailed Oct. 30, 2008. 10 pages.

International Search Report and Written Opinion of PCT/ US2010/025463 mailed on Jun. 30, 2010. 12 pages.

International Search Report of PCT/US2010046852 mailed Dec. 29, 2010. 5 pages.

Rowe et al. "Multispectral Fingerprint Images Acquisition". Advances in Biometrics. 2008. 22 pages.

* cited by examiner

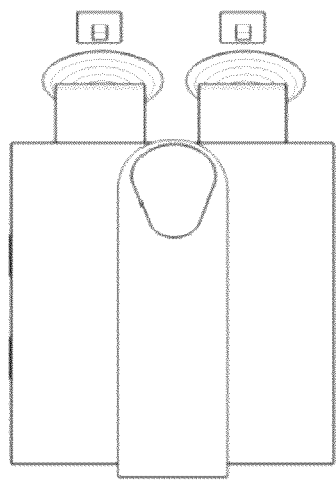
Fig. 2B
Top
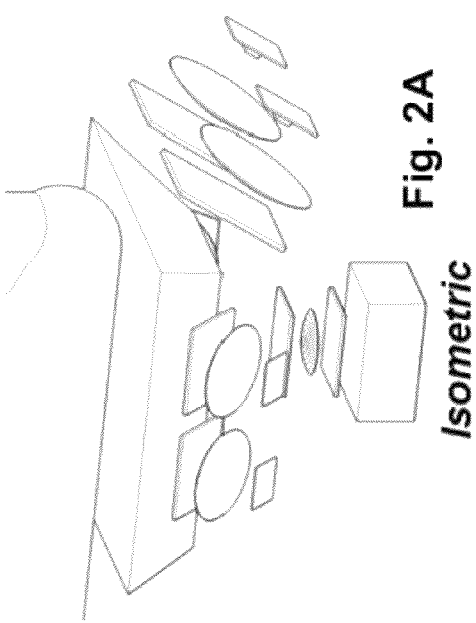
Fig. 2A
Isometric
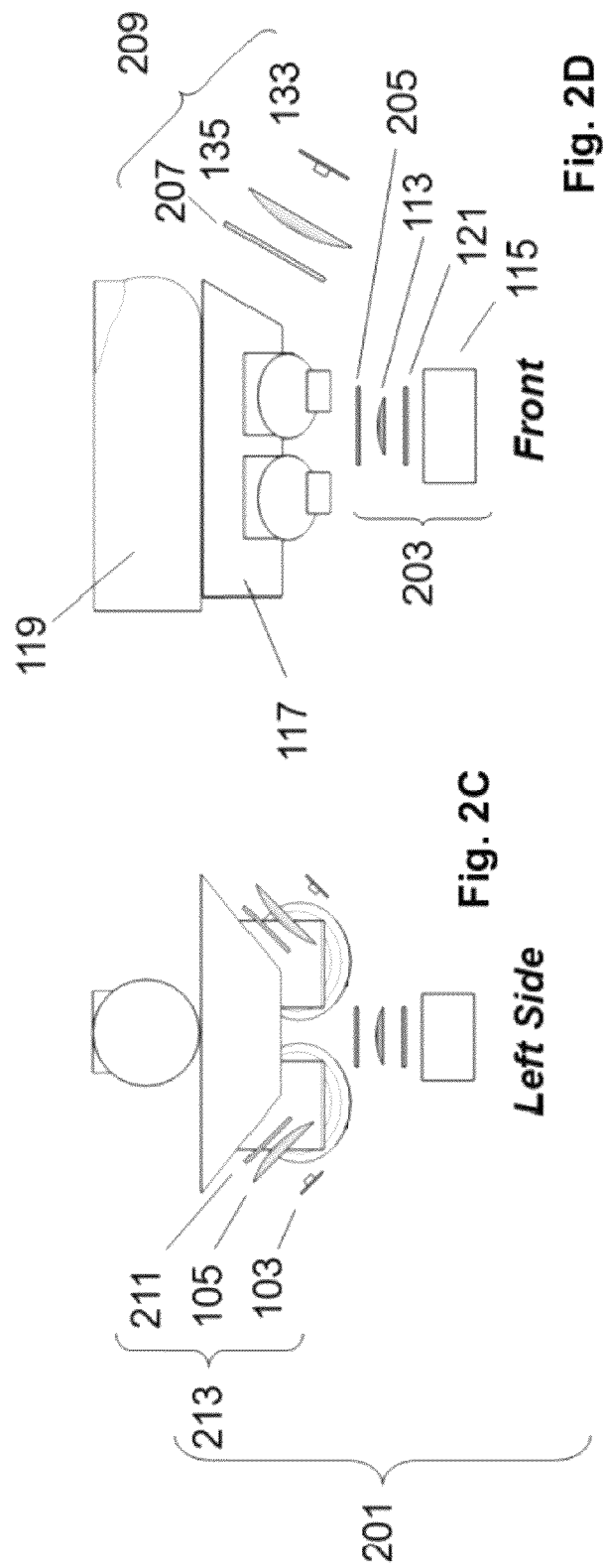
Fig. 2C
Left Side
Fig. 2D
Front

Parallel Polarizers

Crossed Polarizers

$I_{Detected} = I_{Detected, Parallel} + I_{Detected, Crossed}$ $= (I_S + I_D) + I_D$ $= I_S + 2 I_D$

No Illumination-side Polarizer

OPTICAL BIOMETRICS IMAGING WITH FILMS

CROSS-REFERENCES TO RELATED APPLICATIONS

This application is a continuation of U.S. patent application Ser. No. 13/220,399, filed Aug. 29, 2011 by Robert K. Rowe ("the '399 application"). The '399 application is a continuation of U.S. patent application Ser. No. 12/557,406, entitled "Two Camera Biometric Imaging," filed Sep. 9, 2009 by Robert K. Rowe ("the '406 application). The '406 application is a continuation of, and claims the benefit of, commonly assigned U.S. Pat. No. 7,835,554, filed Oct. 29, 2008, entitled "Multispectral Imaging Biometrics" ("the '554 patent"). The '554 patent is a continuation of, and claims the benefit of, commonly assigned U.S. Pat. No. 7,460,696, filed Apr. 25, 2005, entitled "Multispectral imaging Biometrics" ("the '696 patent"). The '696 patent is a non-provisional of, and claims the benefit of, each of the following provisional applications: U.S. Prov. Pat. Appl. No. 60/576,364, filed Jun. 1, 2004, entitled "Multispectral Finger Recognition"; U.S. Prov. Pat. Appl. No. 60/600,867, filed Aug. 11, 2004, entitled "Multispectral Imaging Biometric"; U.S. Prov. Pat. Appl. No. 60/610,802, filed Sep. 17, 2004, entitled "Fingerprint Spoof Detection Using Multispectral Imaging"; U.S. Prov. Pat. Appl. No. 60/654,354, filed Feb. 18, 2005, entitled "Systems And Methods For Multispectral Fingerprint Sensing"; and U.S. Prov. Pat. Appl. No. 60/659,024, filed Mar. 4, 2005, entitled "Multispectral Imaging Of The Finger For Biometrics." The entire disclosure of each of these prior applications is incorporated herein by reference for all purposes.

This application is related to commonly assigned U.S. patent application Ser. No. 11/009,372, filed Dec. 9, 2004, entitled "Methods And Systems For Estimation Of Personal Characteristics From Biometric Measurements," now U.S. Pat. No. 7,263,213, issued Aug. 28, 2007, U.S. patent application Ser. No. 11/115,101, filed Apr. 25, 2005, entitled "Multispectral Biometric Imaging," now U.S. Pat. No. 7,394,919, issued Jul. 1, 2008, and U.S. patent application Ser. No. 11/115,075, filed Apr. 25, 2005, entitled "Multispectral Liveness Determination," the entire disclosure of each of which is incorporated herein by reference for all purposes.

BACKGROUND OF THE INVENTION

This application relates generally to biometrics. More specifically, this application relates to multispectral imaging biometrics.

"Biometrics" refers generally to the statistical analysis of characteristics of living bodies. One category of biometrics includes "biometric identification," which commonly operates under one of two modes to provide automatic identification of people or to verify purported identities of people. Biometric sensing technologies measure the physical features or behavioral characteristics of a person and compare those features to similar prerecorded measurements to determine whether there is a match. Physical features that are commonly used for biometric identification include faces, irises, hand geometry, vein structure, and fingerprint patterns, which is the most prevalent of all biometric-identification features. Current methods for analyzing collected fingerprints include optical, capacitive, radio-frequency, thermal, ultrasonic, and several other less common techniques.

Most of the fingerprint-collection methods rely on measuring characteristics of the skin at or very near the surface of a finger. In particular, optical fingerprint readers typically rely on the presence or absence of a difference in the index of refraction between the sensor platen and the finger placed on it. When the angle of light at an interface is greater than the critical angle and an air-filled valley of the fingerprint is present at a particular location of the platen, total internal reflectance ("TIR") occurs in the platen because of the air-platen index difference. Alternatively, if skin of the proper index of refraction is in optical contact with the platen, the TIR at this location is "frustrated," allowing light to traverse the platen-skin interface. A map of the differences in TIR across the region where the finger is touching the platen forms the basis for a conventional optical fingerprint reading. There are a number of optical arrangements used to detect this variation of the optical interface in both bright-field and dark-field optical arrangements. Commonly, a single quasimonochromatic beam of light is used to perform this TIR-based measurement.

There also exists non-TIR optical fingerprint sensors. Some non-TIR contact sensors rely on some arrangement of quasimonochromatic light to illuminate the front, sides, or back of a fingertip, causing the light to diffuse through the skin. The fingerprint image is formed because of the differences in light transmission through the finger and across the skin-platen interface for the ridge and valleys. The difference in optical transmission at the interface is due to changes in the Fresnel reflection characteristics that result from the presence or absence of intermediate air gaps in the valleys. Some non-TIR sensors are non-contact sensors, which use polarized light to image the surface features of the finger. In some cases the imaging system may include a linear polarizer and the illumination light may be polarized in parallel and perpendicular directions to provide two images, which are then combined in some manner to enhance the surface features of the finger.

Although optical fingerprint readers based on TIR phenomena are one of the most commonly deployed types of fingerprint sensors, they are susceptible to image-quality problems due to non-ideal conditions. If the skin is overly dry, the index match with the platen will be compromised, resulting in poor image contrast. Similarly, if the finger is very wet, the valleys may fill with water, causing an optical coupling to occur all across the fingerprint region and greatly reduce image contrast. Similar effects may occur if the pressure of the finger on the platen is too little or too great, the skin or sensor is dirty, the skin is aged and/or worn, or overly fine features are present such as may be the case for certain ethnic groups and in very young children. These effects decrease image quality and thereby decrease the overall performance of the fingerprint sensor. In one recent study, 16% of fingerprint images were found to be of suboptimal image quality as a result of these effects. In some cases, commercial optical fingerprint readers incorporate a thin membrane of soft material such as silicone to help mitigate some of these effects and restore performance. As a soft material, the membrane is subject to damage, wear, and contamination, limiting the use of the sensor before it requires maintenance.

Biometric sensors, particularly fingerprint biometric sensors, are generally prone to being defeated by various forms of spoof samples. In the case of fingerprint readers, a variety of methods are known in the art for presenting readers with a fingerprint pattern of an authorized user that is embedded in some kind of inanimate material such as paper, gelatin, epoxy, latex, or the like. Thus, even if a fingerprint reader can be considered to reliably determine the presence or absence of a matching fingerprint pattern, it is also critical to the overall system security to ensure that the matching pattern is being acquired from a genuine, living finger, which is difficult to ascertain with many existing sensors.

There is accordingly a general need in the art for improved methods and systems for biometric sensing.

BRIEF SUMMARY OF THE INVENTION

Embodiments of the invention provide methods of performing a biometric measurement on an individual. A purported skin site of the individual is illuminated under a plurality of distinct optical conditions during a single illumination session. Light scattered beneath a surface of the purported skin site is received separately for each of the plurality of distinct optical conditions. A multispectral image of the purported skin site is derived from the received light. A biometric function is performed with the derived multispectral image.

A number of different biometric functions may be performed in different embodiments. In one embodiment, performing the biometric function comprises verifying an identity of the individual. In a further embodiment, performing the biometric function comprises comparing the multispectral image with a plurality of multispectral images stored in a database relating the plurality of multispectral images to identities of people. The individual is identified by finding a match between the multispectral image and one of the plurality of multispectral images stored in the database. In another embodiment, performing the biometric function comprises comparing the multispectral image with a plurality of non-multispectral images stored in a database relating the plurality of non-multispectral images to identities of people. The individual is identified by finding a correspondence between the multispectral image and one of the plurality of non-multispectral images stored in the database. For example, the database may comprise values derived from the non-multispectral images, in which case the multispectral image may be compared with the plurality of non-multispectral images by extracting features from the multispectral image and comparing the features with the values.

A number of different of characteristics may also be used in generating the plurality of distinct optical conditions. For example, in one embodiment, the plurality of distinct optical conditions comprise distinct polarization conditions. In another embodiment, the plurality of distinct wavelengths of illumination light. In such an embodiment, the purported skin site of the individual may be simultaneously illuminated with illumination at a plurality of distinct wavelengths, perhaps in the form of a continuum of wavelengths, and the scattered light filtered to separate the plurality of distinct wavelengths.

Polarization may also be used to ensure that detected light has undergone multiple scatter events. For example, the purported skin site may be illuminated with light having a first polarization for each of the distinct optical conditions. The received light may be polarized with a second polarization, with the first and second polarizations substantially defining a cross-polarization condition. The first and second polarizations could each be linear polarization or could each be circular polarizations in different embodiments.

In one embodiment, an image of surface structure of the skin site may also be collected. For instance, the skin site may be illuminated with light from within the platen at an angle greater than a critical angle defined by an interface of the platen with an environment external to the platen, with the surface structure corresponding to portions of the skin site in contact with the platen. A position of the purported skin site may be substantially unchanged during the single illumination session.

Another set of embodiments provide a multispectral sensor. A platen is adapted for placement of a purported skin site by an individual. An illumination source is disposed to illuminate the purported skin site when placed on the platen. An imaging system is disposed to receive light scattered beneath a surface of the purported skin site. A controller is interfaced with the illumination source and the imaging system. The controller includes instructions to illuminate the purported skin site with the illumination source under a plurality of distinct optical conditions during a single illumination session in which a position of the purported skin site on the platen is substantially unchanged. The controller also includes instructions to derive a multispectral image of the purported skin site from light received by the imaging system separately for each of the plurality of optical conditions. A biometric function is performed with the derived multispectral image. The multispectral sensor may sometimes be conveniently comprised by a portable electronic device.

Several embodiments use polarization. In one such embodiment, the multispectral sensor further comprises a first polarizer disposed to polarize the light provided by the illumination source. The imaging system comprises a second polarizer disposed to polarize the light scattered beneath the surface of the skin site. The plurality of optical conditions comprise distinct relative polarization conditions. In another such embodiment, the multispectral sensor also further comprises a first polarizer disposed to polarize the light provided by the illumination source and a second polarizer disposed to polarize the light scattered beneath the surface of the skin site. The first and second polarizers may be provided in a crossed configuration.

In some embodiments, the imaging system comprises a color filter array having a plurality of distributed filter elements. Each filter element is adapted to transmit light of one of a limited number of specified narrowband wavelength ranges. The plurality of distinct optical conditions comprise distinct wavelengths of illumination light within the specified narrowband wavelength ranges. In one such embodiment, the instructions to illuminate the purported skin site with the illumination source under the plurality of distinct optical conditions comprise instructions to illuminate the purported skin site with different wavelengths sequentially. In another such embodiment, the instructions to illuminate the purported skin site with the illumination source under the plurality of distinct optical conditions comprise instructions to illuminate the purported skin site with the plurality of wavelengths simultaneously.

In another embodiment, the controller further includes instructions to illuminate the skin site with light from within the platen at an angle greater than a critical angle defined by an interface of the platen with an environment external to the platen. An image is derived of surface structure of the skin site from light incident on the interface of the platen where the skin site is in contact with the platen.

In a further set of embodiments, a method is provided of analyzing a tissue site. Light scattered from the tissue site is received under first and second distinct polarization conditions during a single illumination session in which a position of the tissue site is substantially unchanged. The second polarization condition does not define a complementary state relative to the first polarization condition. An image of the tissue site is derived from the received light.

At least one of the first and second polarization conditions may comprise a substantially random polarization condition. Receiving light scattered from the tissue site under one of the first and second distinct polarization conditions may comprise illuminating the tissue site with light having a first polarization and detecting light having the first polarization scattered from the tissue site. Alternatively, the tissue site may be illuminated with light having a first polarization and light having a second polarization complementary to the first polarization scattered from the tissue site may be detected. The image of the tissue site may be derived by deriving a first image of the tissue site from light received for the first polarization condition and deriving a second image of the tissue site from light received for the second polarization condition. A linear combination may then be performed of the first and second images. In some embodiments, a biometric function may be performed with the derived image.

BRIEF DESCRIPTION OF THE DRAWINGS

A further understanding of the nature and advantages of the present invention may be realized by reference to the remaining portions of the specification and the drawings wherein like reference labels are used through the several drawings to refer to similar components. In some instances, reference labels include a numerical portion followed by a latin-letter suffix; reference to only the numerical portion of reference labels is intended to refer collectively to all reference labels that have that numerical portion but different latin-letter suffices.

The patent or application file contains at least one drawing executed in color. Copies of this patent or patent application publication with color drawings will be provided by the Office upon request and payment of the necessary fee.

FIGS. 2A-2D provide four views of a multispectral biometric sensor shown in another embodiment of the invention.

DETAILED DESCRIPTION OF THE INVENTION

1. Overview

Figure 1:
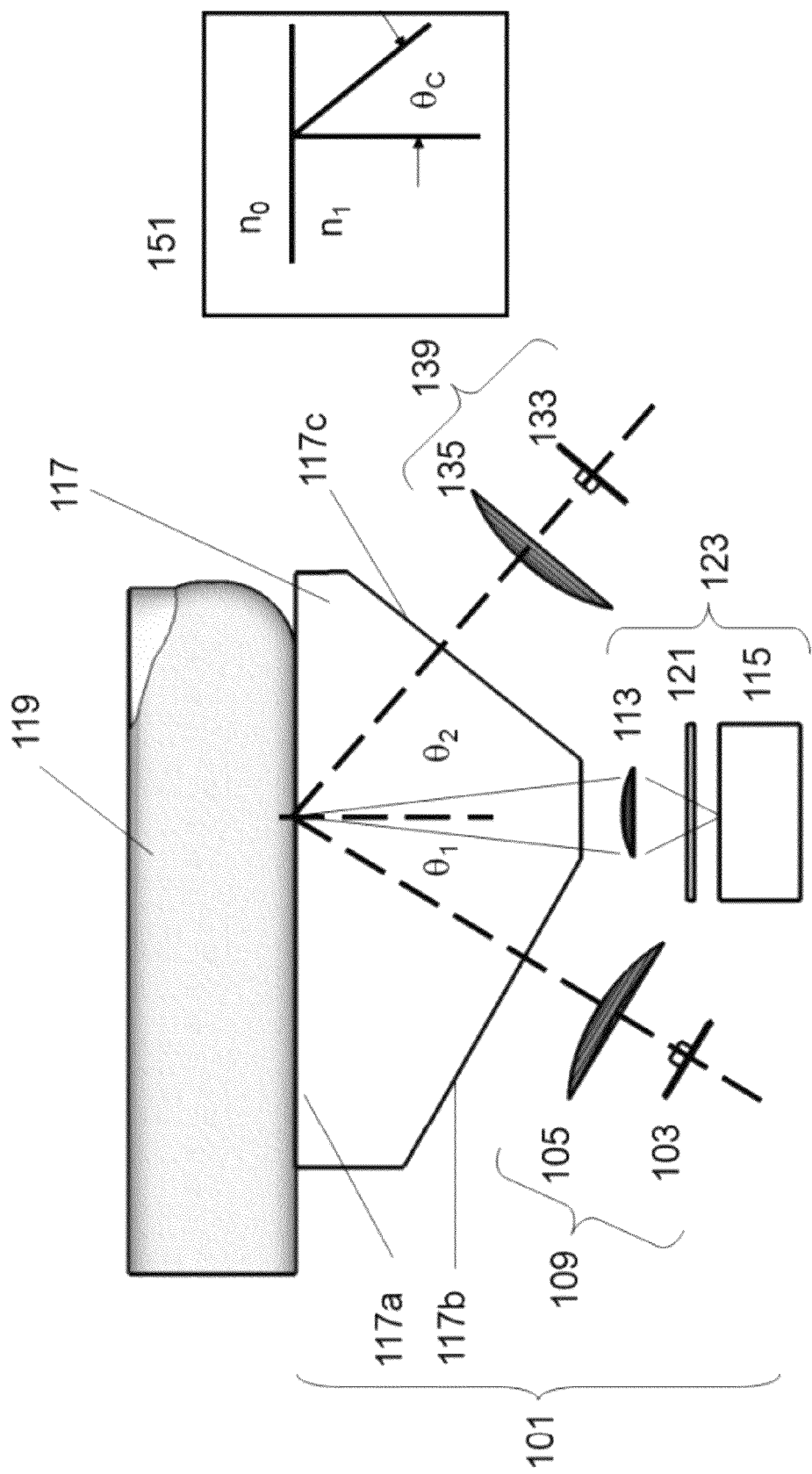
FIG. 1 provides a front view of a multispectral biometric sensor in one embodiment of the invention.

Embodiments of the invention provide methods and systems that allow for the collection and processing of biometric measurements. These biometric measurements may provide strong assurance of a person's identity, as well as of the authenticity of the biometric sample being taken, and may be incorporated within a number of different types of devices, such as cellular telephones, personal digital assistants, laptop computers, and other portable electronic devices, as well as stand-alone devices for physical or logical access. The common characteristic of the methods and systems of the present invention is the application of multiple distinct optical configurations used to collect a plurality of image data during a single illumination session. In some instances, methods and systems are provided for the collection and processing of data using a sensor with two distinct imaging systems. In other instances, the methods and systems disclosed pertain to data collected using a sensor with a single camera.

The sensors of the present invention provide for an information-rich dataset that results in increased security and usability relative to conventional sensors. The increased security derives from combining information from multiple images that represent distinct optical characteristics of the material being measured. These characteristics provide sufficient information to be able to distinguish between living human skin and various artificial materials and methods that might be used to attempt to spoof the sensor. As well, increased security is derived from the aspect of the present invention that provides a mechanism to perform measurements across a wide range of environmental and physiological effects. The robust and reliable sampling means that system security standards do not have to be relaxed to compensate for poor image quality.

Enhanced sensor usability is achieved by reducing the constraints on the individual for precise contact and positioning, as well as the requirement that the individual's skin has particular qualities. As well, the ability to extract subsurface biometric information from images collected under certain optical conditions provides a mechanism for performing biometric determinations even in those cases where the surface features are missing or damaged. In this way, the multispectral measurements made in embodiments of the present invention are advantageously robust to non-ideal skin qualities, such as dryness, excess wetness, lack of resilience, and/or worn features such as are typically associated with the elderly, those who perform significant manual labor, or those whose skin is exposed to chemicals, such as hairdressers or nurses.

The set of all images collected under a plurality of distinct optical conditions during a single illumination session is referred to herein as "multispectral data." The different optical conditions may include differences in polarization conditions, differences in illumination angle, differences in imaging angle and differences in illumination wavelength. In some optical conditions the resulting images are significantly affected by the presence and distribution of TIR phenomena at the interface between the sample and the platen. These images are referred to herein as "TIR images." In some optical conditions, the resulting images are substantially unaffected by the presence or absence of TIR effects at the platen. These images are referred to herein as "direct images."

Skin sites applicable to the multispectral measurements described herein include all surfaces and all joints of the fingers and thumbs, the fingernails and nail beds, the palms, the backs of the hands, the wrists and forearms, the face, the eyes, the ears, and all other external surfaces of the body. While the discussion below sometimes makes specific reference to "fingers" in providing examples of specific embodiments, it should be understood that these embodiments are merely exemplary and that other embodiments may use skin sites at other body parts.

In some embodiments, a sensor provides a plurality of discrete wavelengths of light that penetrate the surface of the skin, and scatter within the skin and/or underlying tissue. As used herein, reference to "discrete wavelengths" is intended to refer to sets of wavelengths or wavelength bands that are treated as single binned units—for each binned unit, information is extracted only from the binned unit as a whole, and not from individual wavelength subsets of the binned unit. In some cases, the binned units may be discontinuous so that when a plurality of discrete wavelengths are provided, some wavelength between any pair of the wavelengths or wavelength bands is not provided, but this is not required. In some instances, the wavelengths are within the ultraviolet—visible—near-infrared wavelength range.

A portion of the light scattered by the skin and/or underlying tissue exits the skin and is used to form an image of the structure of the tissue at or below the surface of the skin. In some embodiments, such an image may include a fingerprint image, where the term "fingerprint" is used broadly herein to refer to any representation of any skin site with dermatoglyphic features.

A detailed description is provided below of examples of multispectral systems that may accordingly be used in embodiments of the invention, but such a description is not intended to be limiting since other techniques may be used in alternative embodiments.

2. Single-Camera Multispectral Imaging

A first example of an embodiment that used multispectral imaging comprising a plurality of different illumination angles is shown in FIG. 1. The multispectral sensor 101 in this embodiment comprises one or more sources of light 103 that illuminate the finger at an angle, $\theta_1$, one or more sources of light 133 that illuminate the finger at an angle, $\theta_2$, and an imaging system 123, which may comprise a digital imaging system. In a preferred embodiment, angle $\theta_1$ is less than the critical angle $\theta_C$, and angle $\theta_2$, is greater than the critical angle. The number of illumination sources may conveniently be selected to achieve certain levels of illumination, to provide for multiple illumination wavelengths, to provide for multiple polarization conditions, to meet packaging requirements, and to meet other structural constraints of the multispectral biometric sensor 101.

Illumination passes from the sources 103, 133 through illumination optics that shape the illumination to a desired form, such as in the form of flood light, light lines, light points, and the like. The illumination optics 105, 135 are shown for convenience as consisting of lenses but may more generally include any combination of one or more lenses, one or more mirrors, and/or other optical elements. The illumination optics 105, 135 may also comprise a scanner mechanism (not shown) to scan the illumination light in a specified one-dimensional or two-dimensional pattern. The light sources 103, 133 may comprise a point source, a line source, an area source, or may comprise a series of such sources in different embodiments. The sources 103, 133 may be narrow band sources such as monochromatic LED's and laser diodes or may be broad band sources such as white-light LED's or incandescent sources. In the case where light sources 103, 133 comprise a series of sources, the series of sources may be of the same wavelength or different wavelengths. The different sources 103, 133 may be configured identically or they may differ from each other.

After the light passes through the illumination optics 105, 135 it passes through a platen 117 and illuminates the finger 119 or other skin site so that reflected light is directed to an imaging system 123. The platen 117 may be configured in such a manner that illumination entering the platen will traverse the platen 117 at the desired angles. In the case of illumination system 109, which illuminates the skin site at an angle, $\theta_1$, the facet, 117b, is oriented roughly normal to the illumination axis. Likewise, in the case of the illumination system 139, which illuminates the skin site at an angle, $\theta_2$, the facet 117c is oriented at a steeper angle to be approximately normal to the corresponding illumination angle.

In a preferred embodiment, angle $\theta_1$ is less than the critical angle and angle $\theta_2$ is greater than the critical angle, which is defined as the angle at which total internal reflection occurs. Inset 151 shows the geometry associated with calculating the critical angle at the interface between two materials with different indices of refraction. As known in the art, refraction of light will generally occur at such an interface. The angle of refraction will be different for different illumination angles and will be governed by an equation of the form:

$$n_0 \sin \theta_0 = n_1 \sin \theta_1,$$

where $n_0$ is the refractive index in medium 0, $n_1$ is the refractive index in medium 1, and the angles, $\theta_0$ and $\theta_1$, are measured in the respective media from the normal to the interface.

When $n_0$ is less than $n_1$, the critical angle, $\theta_c$, is given by:

$$\theta_C = \sin^{-1}\left(\frac{n_0}{n_1}\right),$$

In the case where $n_0$ is approximately equal to 1.0 corresponding to air and $n_1$ is approximately equal to 1.5 corresponding to a type of glass, the critical angle is approximately 41.8 degrees. In a case such as this, the illumination angle, $\theta_1$, may range from 0 up to approximately 40 degrees while illumination angle $\theta_2$ will be at an angle greater than 41.8 degrees but less than the critical angle defined by the interface between the platen and the finger skin. For skin with an index of refraction of 1.4 this secondary critical angle is approximately 70.0 degrees.

In the case where $\theta_1$ is less than the critical angle, the illumination light from subsystem 109 passes through the top facet of the platen 117a and will illuminate all portions of the finger 119 if present on or above the platen 117. A portion of the light illuminating the finger 119 will be reflected from the skin surface while a second portion of the light will pass into the skin and undergo optical effects such as scattering and absorption. Generally, a portion of the light that enters the finger skin will scatter back out of the skin and pass back into the platen 117.

In the case where $\theta_2$ is greater than the critical angle and in the absence of a finger, light from subsystem 139 will not pass through facet 117a and will be reflected back into the platen 117. Light will traverse the interface at facet 117a only in those locations that skin or other media with a suitable index of refraction is in direct optical contact with the facet 117a. At the points of contact between the platen 117 and finger 119, light will be partially reflected by the surface of the skin and partially absorbed by the skin in a manner described previously. However, in cases where the illumination wavelength is such that light does not propagate very far in the skin before being absorbed, the light scattered at each point of contact is well localized to that point. This is the case for a variety of different wavelengths in the ultraviolet, visible and near infrared spectral regions. In particular, visible light with a wavelength shorter than approximately 580 nm is highly absorbed by hemoglobin and thus remains well localized to the point of illumination.

When illuminated by either subsystem 109 or 139, light scattered and reflected by the skin may be imaged with an appropriate imaging system. FIG. 1 illustrates an embodiment in which the imaging system 123 comprises a digital imaging system having a digital array 115 and detection optics 113 adapted to focus the light reflected from the object onto the array. For example, the detection optics 113 may comprise a lens, a mirror, a pinhole, a combination of such elements, or may use other optical elements known to those of skill in the art. The array 115 may comprise a silicon imaging array, such as a CCD or CMOS array, an InGaAs array, or other detector arrays as known in the art. In some instances, the imaging system 123 may also comprise an optical filter 121. The optical filter 121 may be a short-wavelength pass filter, which substantially blocks light of wavelengths longer than the illumination wavelength range. Such a configuration has been found by the inventors to provide advantageous performance in the presence of bright, broad-band ambient lighting, since wavelengths of light longer than approximately 580 nm may substantially traverse the finger. In bright sunlight, this long wavelength light may saturate the detector array 121 preventing the acquisition of an image. Blocking such long-wavelength light with filter 121 while passing all desired illumination wavelengths may thus be beneficial.

In some instances the filter 121 may be a color filter array, which may furthermore be incorporated as part of the digital array 115. The color filter array 121 may comprise a red-green-blue filter array in the well-known Bayer pattern. In some instances, the filter elements may function to transmit wavelengths that differ from the standard red-green-blue wavelengths, may include additional wavelengths, and/or may be arranged in a pattern that differs from the Bayer pattern. In instances where such a color filter array 121 is included, the illumination source(s) may be white-light or broadband source(s). Alternatively, the illumination source(s) 103, 133 may comprise a plurality of narrowband sources, such as LEDs, with central wavelengths that are within the pass bands of filter elements comprised by the color filter array 121. In some embodiments, the illumination light is provided within a wavelength range of approximately 400-1000 nm. In other embodiments, wavelengths within the visible range of the spectrum, i.e., in the range of about 400-700 nm, are used. In some cases, a plurality of substantially discrete wavelengths are used, such as in an embodiment where three illumination wavelengths correspond to red, green, and blue colors at about 600, 540, and 450 nm respectively.

The sensor layout and components may advantageously be selected to minimize the direct reflection of the illumination sources 103, 133 into the digital imaging system 123. In one embodiment, such direct reflections are reduced by relatively orienting the illumination and detection optics such that the amount of directly reflected light detected is minimized. For instance, optical axes of the illumination optics 105 and the detection optics 113 may be placed at angles such that a mirror placed on the platen surface 117a does not direct an appreciable amount of illumination light into the detection subsystem 123. In a similar way, the detection optics 113 should be oriented to avoid light from illumination subsystem 139 that undergoes total internal reflectance at platen surface 117a.

In one embodiment, the optical axis of the imaging subsystem 123 is oriented in a manner that enables the imager to "see through" the platen surface 117a rather than be affected by total internal reflectance at this surface. In this way, the imaging subsystem 123 is able to obtain images of light scattered and reflected by a finger at all points rather than just those points where the finger is in contact and of necessary index of refraction. This constraint may be generally met by orienting the imaging subsystem 123 with an angle less than the critical angle, $\theta_c$. In some cases, the imaging subsystem, 123, may be oriented approximately normal to the platen facet 117a.

In another embodiment, the optical axis of the imaging subsystem 123 is oriented in a manner that causes the imager to only see light from those points where the skin of proper index of refraction is in optical contact with the platen surface 117a. This can be achieved by placing the imager 123 at an angle greater than the critical angle, $\theta_c$. If the imager is located at such a position and angle that it sees the illumination light in the absence of a finger or other material touching the surface 117a, it is referred to as a "bright-field" imaging condition. In such a case, points of contact with the finger will appear relatively dark. If the imager is located at such a position and angle that it does not see the illumination light in the absence of a finger or other material touching the surface 117a, it is referred to as a "dark-field" imaging condition. In such a case, points of contact with the finger will appear relatively light. In some cases, optical baffling, optical black coating, and/or other techniques known in the art may be employed to reduce the effect of spuriously scattered light and thereby increase image quality in either imaging condition, and particularly in the dark-field imaging condition.

The specific characteristics of the optical components comprised by the multispectral sensor 101 may be implemented to meet different form-factor constraints. For example, in an embodiment where the multispectral sensor is implemented in the top of a gear shift as part of a system to verify the identity of a driver of a vehicle, the light sources 103, 133 and digital array 115 might not fit within the gearshift handle as constructed. In such an embodiment, an optical relay system may be implemented. For example, relay optics that comprise individual lenses similar to those in a bore scope may be used, or alternatively optical fibers such as used in orthoscopes may be used. In other cases, the optical paths of the illumination subsystems, 109, 139, and/or the detection subsystem, 123, may be folded through the use of mirrors to reduce the overall size. Still other techniques for implementing an optical relay system and/or folding the optical systems will be evident to those of skill in the art. In this way, components of the sensor may be located remotely from the sampling surface or be configured to fit other form-factor constraints.

The multispectral sensor may take multiple images in sequence during an illumination session. For example, in the case of multiple sources of different wavelengths, polarization conditions, and/or angles, the first source may illuminate during which time the camera acquires and stores an image. The first source is then extinguished and a second source is illuminated during which time a second image is acquired and stored. This sequence then continues for all sources and may further include a "dark" image that is collected with no sources illuminated. Also any or all of the image conditions may be repeated an arbitrary number of times during an illumination session. The resulting images may be combined in various ways for subsequent processing. For example, difference images may be generated between each of the illuminated states and the dark image. The difference between these two types of images allows the effect of illumination to be separated from background illumination. The difference images may then be used for further processing according to other aspects of the invention.

FIGS. 2A-2D provide an example of a structure for a multispectral sensor with multiple illumination subsystems in which the optical conditions further include differences in polarization conditions. The basic structure of the sensor 201 is similar to that of FIG. 1, but multiple illumination systems have been depicted. Two illumination subsystems 209 are placed at angles greater than the critical angle, causing total internal reflectance to occur at platen surface 117a in the absence of direct contact with skin. Four illumination subsystems, 213, are oriented at angles less than the critical angle with respect to surface 117a. Polarizers 207, 211 have been added to the illumination subsystems 209, 213 and a polarizer 205 has been added to the imaging system 203. The polarizers 205, 207, 211 may be linear, circular, elliptical, or some combination of the these. The illumination sources 103 (4) and 133 (2) may be broadband or narrowband. If narrowband, the sources may all be the same wavelength or may be substantially different wavelengths. The polarizers 207 and 211 may also provide a "crossed polarization" arrangement or a "parallel polarization" arrangement on some or all of the illumination subsystems 209, 213. One or more of the illumination subsystems 209, 213 may have the polarizer omitted, producing randomly polarized illumination light.

In the case that one of the illumination subsystems 209, 213 provides a crossed polarization arrangement, the polarizer 207, 211 is disposed and oriented to provide illumination light that is polarized orthogonally to the polarization at the imaging system 203. Such orthogonality has utility in ensuring that detected light has undergone multiple scatter events, such as at the skin site 119, since other light will be blocked. This characteristic of crossed polarizers is particularly pronounced in the case where the illumination subsystem 213 is oriented at an angle less than the critical angle. In this case, in the absence of crossed polarizers, light may be detected from surface reflections from the skin, shallow scatter events, and deep scatter events. When crossed polarizers are used, surface and shallow-scattering phenomena are significantly attenuated. Conversely, parallel polarizer may be advantageously employed to accentuate surface features and shallow scattering effects. Random polarization can also be employed advantageously, particularly in conjunction with at least one other polarization state.

In the case of linear polarizers, a crossed polarization arrangement may be provided by having the illumination polarizers 207, 211 oriented so that their axes are separated by approximately 90° from the axis of the detection polarizer 205. In alternative embodiments where the polarizers are circular polarizers, the orthogonality of the crossed polarization arrangement may be achieved by having circular polarizers of opposite sense (i.e., right hand and left hand). Further, in the case of linear polarizers, a parallel polarization arrangement may be provided by having the illumination polarizers 207, 211 oriented so that their axes are approximately parallel to the axis of the detection polarizer 205. In alternative embodiments where the polarizers are circular polarizers, parallel polarization may be achieved by using the same sense of circular polarization. Due to the effect of the polarizers, multiple different optical conditions can be achieved by changing the polarization state of the system, even when only a single illumination wavelength is being used. Of course, multispectral conditions may also comprise the use of different illumination wavelengths, different illumination angles, and different imaging angles, among other combination of different optical conditions.

Further utility is derived from the observation that the cross polarization arrangement greatly reduces the visibility of latent prints left on the platen 117 by previous users, thus providing improved image quality and reducing the likelihood of spoofing by "reactivating" the latent prints. The utility of the arrangement also extends to conventional optical fingerprint readers. In particular, dark-field optical fingerprint systems are well-suited for the additional of polarizing elements in such an arrangement.

More generally, effects such as latent prints may be identified and segmented from the resulting multispectral data based upon their unique optical characteristics. For example, the optical qualities of latent prints with respect to different polarization conditions differ from living human tissue. Similarly, the spectral characteristics of latent prints as a function of wavelength and illumination angle are also quite different from living human tissue. An analysis of the spectral properties of the multispectral data can thus provide a means to separate the real tissue image from artifacts due to latent prints through techniques such as spectral unmixing, as known in the art. Spectral analysis may also be used to perform image segmentation, defining and isolating the region of the image that contains tissue data from the image background. In a similar manner, the totality of information available in the multispectral dataset of the present invention is well suited to distinguishing between genuine human skin and various attempts to use artificial samples or other means to spoof the sensor. The composite optical characteristics of skin over multiple wavelengths, polarization conditions and illumination angles is distinct for human skin, and can be employed to distinguish between skin and many different classes of materials that might be used in an attempt to spoof the sensor.

Figure 3A:
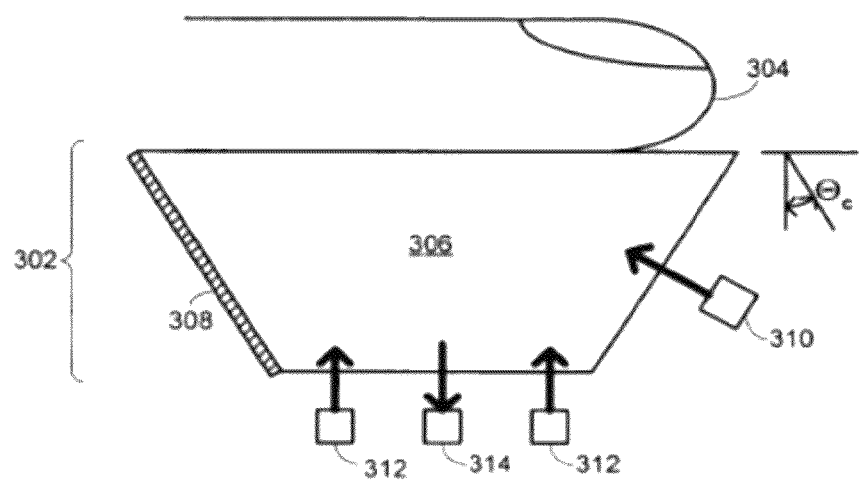
FIG. 3A shows an embodiment of the invention that incorporates total-internal-reflectance illumination, multispectral-imaging illumination, and an optical prism.

The embodiments described in connection with FIGS. 3A-3C combine direct imaging with a variant of TIR imaging in a single integrated unit based on a single camera. As shown in FIG. 3A, the camera 314 may be oriented at an angle less than the critical angle $\Theta_C$ and, in some cases, is oriented to be normal to the finger 304 or other skin site. As such the camera 314 "sees" all of the finger 304 whether or not portions of it are in direct optical contact with the platen 306. One or more TIR-like images may be collected by illuminating with a light source 310 oriented at an angle greater than the critical angle $\Theta_C$. As described above and as known in the art, light from the illuminator 310 will only pass into the skin site 304 at points at which TIR is frustrated by the direct skin-glass contact. Furthermore, if the wavelength(s) of the illumination source 310 are chosen to be wavelengths at which the skin is highly scattering and/or highly absorbing, the light that penetrates the skin at a particular point and is scattered back out will be substantially detected in that same region of the skin. Light that is not transmitted into the skin will be reflected and strike an optically black surface 308 or other form of light dump. In this manner, the arrangement is able to provide one or more TIR images (generated from one or more illumination wavelengths and/or polarization conditions) by relying on illumination-side critical-angle phenomena.

In such a system, the same camera 314 can also be used to acquire direct-imaging data generated by one or more illumination sources 312 oriented at an angle less than the critical angle $\Theta_c$. The source(s) 312 may also incorporate optical diffusers and/or optical polarizers (not shown).

Figure 3B:
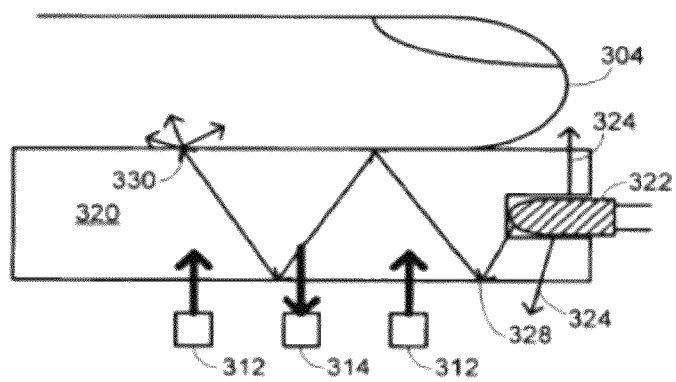
FIG. 3B shows an embodiment of the invention that incorporates a slab platen for total-internal-reflectance illumination and a separate mechanism for direct-imaging illumination.

A second mechanism of introducing TIR illumination into the skin site 304 is shown in FIG. 3B. In this embodiment, a substantially planar slab of material 320 such as glass, acrylic, or other suitable material is oriented as a window. One or more illumination sources 322 such as LED's may be mounted on a side of the planar platen 320 in such a way that a substantial portion of the emitted light is reflected multiple times through TIR reflections 328; a small portion of the emitted light is at too steep an angle to support TIR and is transmitted 324 in close proximate to the source 322. Light that undergoes multiple TIR reflections passes through the platen 320 at the points where there is contact with the skin site 304 when the skin has appropriate optical characteristics. This transmitted light 330 thus illuminates the skin site 304 in a manner that allows capture of a TIR image by the camera 314. In cases where it is not practical to embed the light source 322 directly in the platen 320, the light source 322 may be mounted externally on the outside of the platen 320. A simple lens or other optical element may be used to efficiently couple light from the external source to the platen 320. The multispectral imaging is performed using the same camera 314 and with light sources 312 as described in connection with FIG. 3A.

Figure 3C:
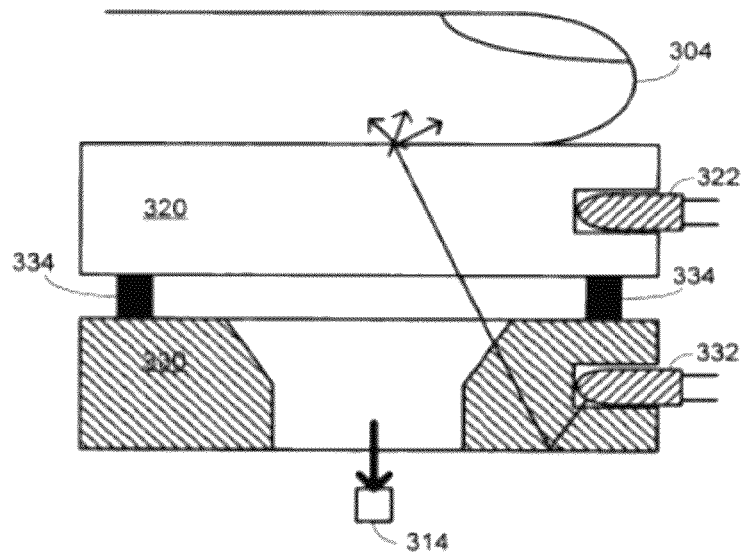
FIG. 3C shows an embodiment of the invention that incorporates a slab platen for total-internal-reflectance illumination and a separate slab for direct-imaging illumination.

The slab illumination concept of FIG. 3B is further extended to provide direct illumination with the embodiment shown in FIG. 3C. In this instance, a second slab 330 is placed below the TIR slab 320. The two slabs 330 and 320 may be separated, such as by providing an air gap in one embodiment through the use of spacers 334. The direct-imaging slab 330 may incorporate features such as a hole and bevels to allow the light to escape at points that cause broad illumination of the skin site 304. Etching, scoring, diffuse coating, and/or features molded into the upper or lower surfaces of the direct-imaging slab 330 may be used to cause the light to be emitted from the slab 330 at the desired location(s). One or more illumination sources 332 for the direct imaging may be mounted on the side of, or in, the second slab 330 to provide the multispectral illumination. Collection of both TIR and direct imaging data may be performed with a single light detector 314, similar to the embodiments described in connection with FIGS. 3A and 3B.

Merely by way of example, the inventors have constructed operating models of a one-camera multispectral imaging system similar to that depicted in FIG. 3B using the following specific components. The digital array was provided with a monochrome 640×480 CCD camera, namely a Lumenera model #LU-070, interfaced to a PC host through a USB interface. The illumination sources 312, 322 comprised 24 high-brightness, 5 mm dia. Packaged LEDs powered by a laboratory power supply and controlled through a USB solid-state relay (OnTrak ADU218). Software control of the LEDs, the imager, and the associated image processing was performed with custom software written to operate within a MATLAB environment (Mathworks, Matlab 7.0).

The LEDs comprised four different groups of Vishay LEDs (TLCXXXX) of nominally blue, green, yellow, and red colors. Four of each color were inserted into each of the sides of a square acrylic platen to provide TIR illumination in a manner similar to component 322 in FIG. 3B to provide direct illumination. In addition, 4 blue LEDs and 4 green LEDs were mounted near the camera axis in a manner similar to components 312 in FIG. 3B. Polarizing film (Edmund Optics, NT38-495) was placed on the camera lens. Additional pieces of the polarizing film were cut out and used to cover the direct illuminators in some experiments. Both parallel and perpendicular polarization configurations were investigated, as was the case where the direct illumination sources were left unpolarized.

Figure 4A:
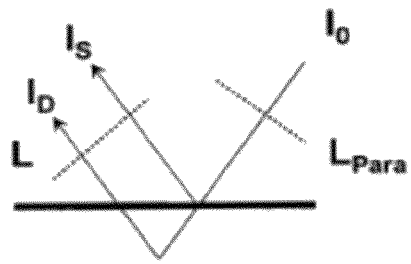
FIGS. 4A-4C illustrate effects of different polarization configurations used in different embodiments.
Figure 4B:
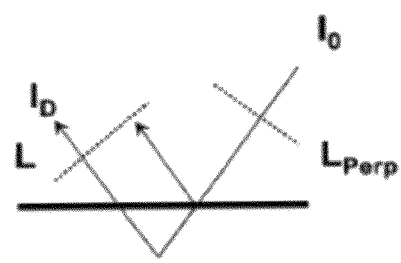
Figure 4C:
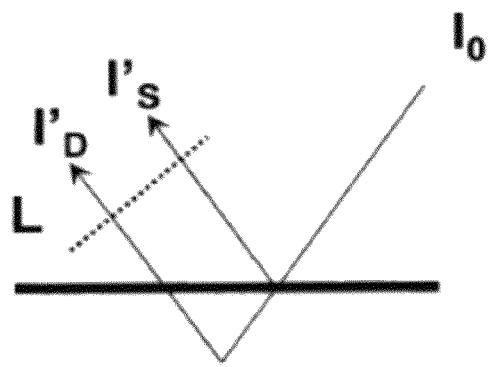

The inventors used the system to investigate the characteristics and utility of different types of polarization conditions. In particular the inventors examined the cases of parallel polarization, perpendicular polarization and random polarization. The results of the investigation can be better understood by referring to FIGS. 4A-4C, which illustrate the effect of ideal polarizers in an imaging system. FIG. 4A illustrates the case of a linear polarizer used in the detection arm and a parallel linear polarizer used in the illumination arm. In this case, the light detected from a material such as skin is a combination of surface-reflected light ($I_S$) and light from the subsurface skin ($I_D$). In contrast, FIG. 4B illustrates the case of crossed or perpendicular polarizers where under ideal circumstances the detected light originates only from subsurface optical interactions ($I_D$). Finally, FIG. 4C illustrates the case wherein the polarizer is omitted from the illumination arm and assuming the source is randomly polarized. In this case the resulting signal comprises both surface ($I_S$) and subsurface ($I_D$) portions, but $I_D$ is twice the magnitude as was observed in the case of parallel polarization, FIG. 4A. From this, one can see the manner in which parallel polarization geometries emphasize the surface features (or de-emphasize the subsurface features) relative to the case of random polarization, and crossed polarization emphasizes the subsurface features. Moreover, these results demonstrate that if any two polarization conditions are measured (i.e., perpendicular+parallel, perpendicular+random, parallel+random), the separation of surface and subsurface effects can be achieved through an appropriate linear combination of the two images.

3. Two-Camera Multispectral Imaging

Figure 5:
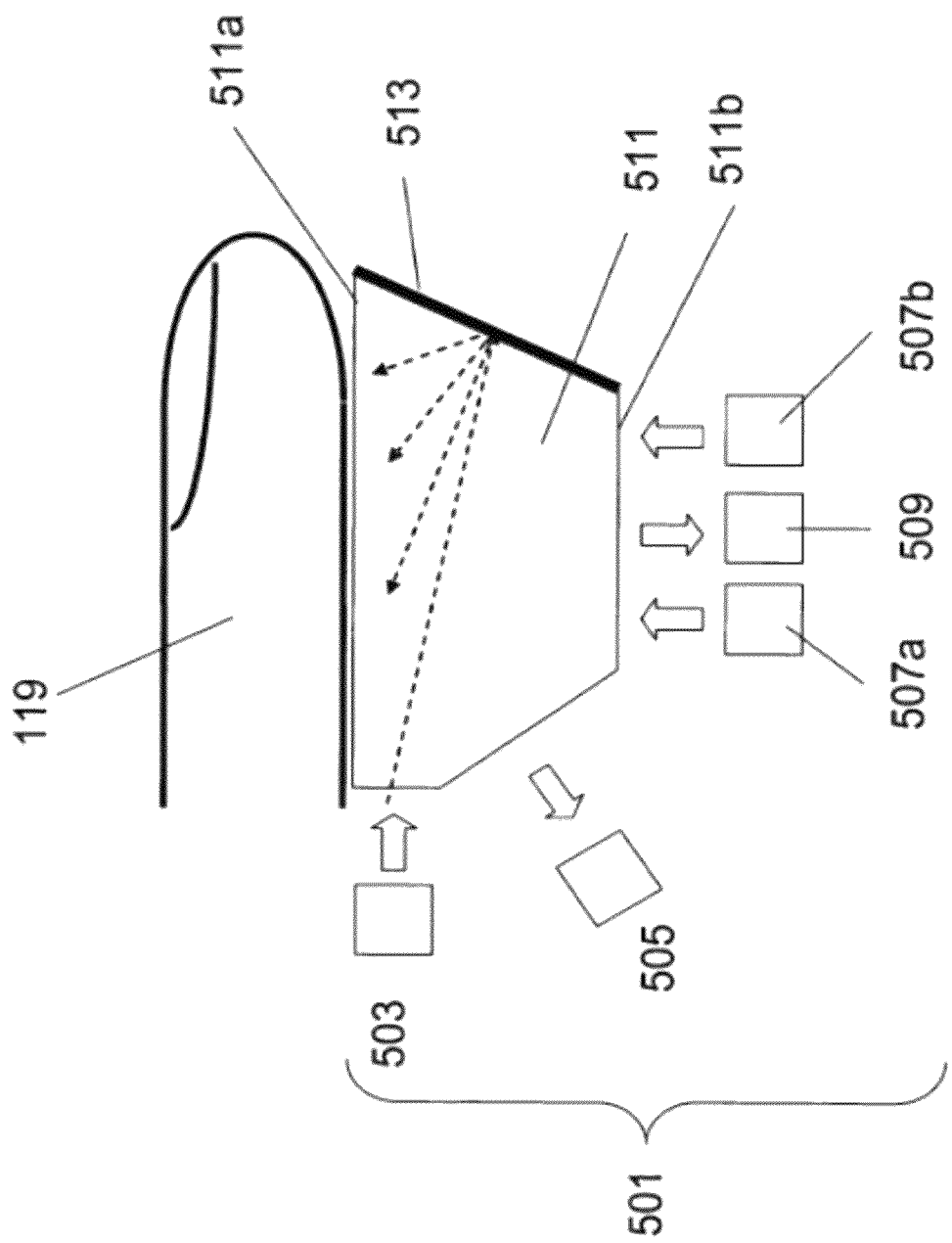
FIG. 5 provides a schematic illustration of a multiple-camera embodiment of the invention.

In a number of embodiments, the multispectral principles described above may be integrated with other biometric techniques to provide a multifactor biometric system. Integration with a conventional TIR imaging system is particularly suitable, as illustrated in FIG. 5. Conventional optical fingerprint readers are generally configured such that the imager has an optical axis that is greater than the critical angle defined by the platen-air interface, but less than the critical angle formed by the platen-skin interface. In this way, the points of contact between the skin and platen cause a distinct optical contact. The points of contact so imaged can be bright or dark relative to the region without contact depending on the exact configuration of the fingerprint sensor. Illumination in such conventional systems can be greater or less than the critical angle, depending on whether the system is configured as a bright-field or dark-field imager. Typically, red light is used for illumination, which readily penetrates the skin and is highly scattered. In such cases, the illumination that passes into the skin is nonlocal and lights up a significant amount of the skin beyond the original illumination point.

FIG. 5 shows a conventional bright-field fingerprint sensor that has been modified in accordance with an embodiment of the present invention. The conventional part of the sensor is comprises a light-source 503, a platen 511 and an imaging system 505. The imaging system 505 may comprise lenses, mirrors, optical filters, a digital imaging array and other such optical elements (not shown). The optical axis of imaging system 505 is at an angle greater than the critical angle with respect to surface 511*a*. The light from the source 503 passes into the platen 511 and strikes a diffuse reflective coating 513, which broadly illuminates the platen surface 511*a*. In the absence of a finger 119, light undergoes TIR at surface 511*a* and a portion is collected and forms a TIR image by imaging system 505. When skin of proper index of refraction is in optical contact with the platen surface 511*a*, the points of contact will form relatively dark regions on the resulting image. Other variants of conventional optical fingerprint readers use different locations of sources 503 and/or imaging systems 505, to achieve a dark-field TIR image.

A second imaging system 509 may be added to the conventional geometry as shown in FIG. 5. The second imaging system 509 looks up at the finger 119 through facet 511*b*. Imaging system 509 has an optical axis less than the critical angle with respect to facet 511*a*. In some embodiments, imaging system 509 is oriented approximately normal to facet 511*a*. This imaging system may comprise lenses, mirrors, optical filters and a digital imaging array (not shown). In this manner, when light source 503 is illuminated, a TIR image may be captured by camera 505 while a direct image may be captured by camera 509. The inventors have discovered that even in cases where the TIR image is adversely affected by water, dirt, lack of contact, dry skin, etc, the image captured by camera 509 has been relatively unaffected and generally contains usable biometric features including the fingerprint pattern.

Imaging system 509 may further incorporate an optical polarizer (not shown), which may be a linear polarizer or elliptical (e.g., circular) polarizer. As well, other light sources 507 may be added to the system. The light sources 507 may be incandescent sources such as quartz-tungsten-halogen lamps or others commonly known in the art. The sources 507 may be other broad-band sources such as white-light LEDs or others known in the art. The sources may be quasi-monochromatic sources such as solid-state LEDs, organic LEDs, laser diodes, other kinds of lasers and quasi-monochromatic sources known in the art. The sources 507 may further comprise lenses, mirrors, optical diffusers, optical filters and other such optical elements.

The sources 507 may be substantially the same or may provide for different illumination wavelengths, angles, and polarization conditions. In the latter case, one of the sources 507*a* may have an optical polarizer (not shown) that is oriented substantially orthogonal to the polarizer incorporated in the imaging system 509. Such an optical geometry tends to emphasize features of the skin that lie below the surface. One of the light sources 507*b* may incorporate a polarizer that is substantially parallel to the polarizer used in imaging system 509, which will tend to emphasis surface features of the skin. The light sources 507 may be of the same wavelength or of different wavelengths (with or without polarizers). The number and arrangement of sources 507 may be different for different embodiments to accommodate form-factor constraints, illumination-level constraints, and other product requirements.

In one embodiment, the sources 507 are oriented at an angle less than the critical angle with respect to facet 511*a*. In a preferred embodiment, sources may be located at such an angle and position such that no direct reflection of the source is seen by imaging system 509 or 505. Such direct reflections can also be greatly mitigated through the use of crossed-polarizer configurations, but some image artifacts will still be generally present if the sources are in the field of view. Moreover, parallel-polarized and non-polarized configurations are very susceptible to such back reflections.

Merely by way of example, the inventors have constructed operating models of a two-camera multispectral imaging system using the following specific components. A Cross Match V300LC CIR fingerprint sensor was modified to accommodate a second imager and additional optical components. The second imager was provided with a monochrome 640×480 CCD camera, namely a Lumenera model #LU-070, interfaced to a PC host through a USB interface. The illumination sources 103 comprised 72 discrete 0402 LED packages mounted to a custom printed circuit board controlled through available general-purpose input/output ("GPIO") pins available on the Lumenera camera board. The LEDs comprised six different groups of Kingbright, APHHS005XXX LEDs at nominal wavelength values of 400, 445, 500, 574, 610, and 660 nm. They were contained in two custom aluminum housings oriented on either side of the camera lens. The housings were used to limit scattered light and to provide a mechanism for covering the LEDs with a diffuser and linear polarizer. The diffusing film was Nitto Denko, H60 and the polarizers were cut from Edmund Optics, NT38-495. An additional piece of the polarizing film was cut out and placed above the camera lens. In some instances, the source and camera polarizers were set to be substantially orthogonal. In other instances the polarizers were set to be substantially parallel. In still other instances the source and/or camera polarizers were omitted. Software control of the LEDs, the imager, and the associated image processing was performed with custom software written to operate within a MATLAB environment (Mathworks, Matlab 7.0).

A second operating model was constructed in a similar fashion, but was capable of simultaneous collection of different illumination wavelength conditions. The second imaging sensor that was added to a modified Cross Match sensor was a color imager (OmniVision OV9121) that comprised a color filter array with red, green, and blue filters in a Bayer pattern. The illumination LEDs were chosen to have wavelengths that were contained within each of the three filter passbands. The acquisition of the three different wavelengths could be performed simultaneously by illuminating all LEDs at the same time and acquiring a single image. The raw image (not color corrected) was then sub-sampled in a manner consistent with the Bayer pattern to produce three sub-images representing the red, green, and blue illumination conditions. Alternatively, a white-light source such as a white-light LED or an incandescent source could have been used. In such a case, the filters on the color filter array would effectively select a particular set of discrete wavelengths from the continuum of illumination wavelengths.

4. General System Description

Figure 6:
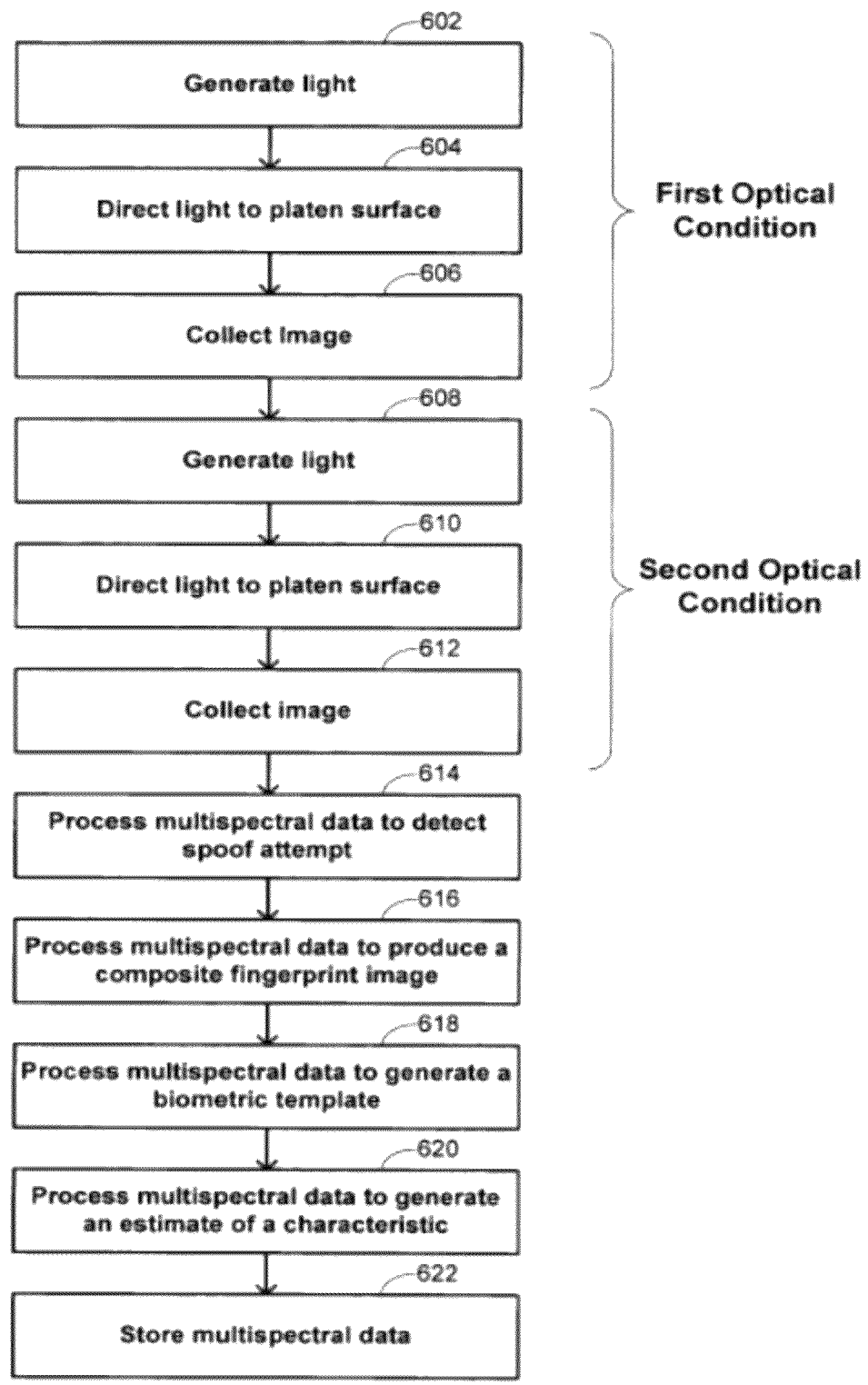
FIG. 6 provides a flow diagram illustrating methods for performing biometric determinations of identity and/or sample authenticity using measurements at a plurality of distinct optical conditions.

Ways in which data may be collected with the structures shown in FIGS. 1-3 and FIG. 5 and used for various biometric tasks are summarized with the flow diagram of FIG. 6. While the flow diagram uses a particular ordering, this ordering is not intended to be limiting. In other embodiments, the order in which certain functions are performed may be varied without exceeding the scope of the invention. Furthermore, the identification of specific functions in the flow diagram is not intended to be restrictive. In other embodiments, some of the functions may be omitted or additional functions may be performed without exceeding the scope of the invention. The method described in connection with FIG. 6 may be performed using any of the structures described in connection with FIGS. 1-3 and 5 and with other structures that will be evident to those of skill in the art after reading this description.

Blocks 602-606 correspond generally to the collection of an image under a first set of optical conditions, with light being generated with a light source at block 602 and directed to the platen surface at block 604 to provide illumination to the skin site in cases where the finger is present and other necessary optical conditions are met. As indicated at block 606, the image is then collected with light from the skin site at a light detector.

Blocks 608-612 correspond generally to the collection of a second image collected under a second set of optical conditions, otherwise replicating the steps in blocks 602-606. In one embodiment, the first and second optical conditions may comprise using two cameras with two different angular orientations. In particular the first image 606 may be collected using a camera oriented at an angle less than the critical angle with respect to the platen surface, while the camera used to collect the second image 612 may be oriented at an angle greater than the critical angle. In one embodiment, the first and second optical conditions may be conveniently measured using the same camera but differ in the characteristics of the illumination light 602, 608. For example, the light generated in the first optical condition 602 may strike the sample surface of the platen at an angle less than the critical angle while the light generated in the second optical condition 608 may strike the sample surface of the platen at an angle greater than the critical angle. As another example, the light generated in the first optical condition 602 may be polarized at an angle that is perpendicular to the polarizer used to collect the first image 606 while the light generated in the second optical condition 608 may be randomly polarized. As yet another example, the light generated in the first optical condition 602 may be a particular wavelength while the light generated in the second optical condition 608 may be of a different wavelength.

In some embodiments, the collection of the images under the first and second illumination conditions may occur substantially simultaneously. For example, in the case that the two different illumination wavelengths are used, a color filter array may be applied to the imager to allow acquisition of both wavelengths during a single acquisition interval. In a similar way, an array that comprises different polarization elements (e.g., parallel, perpendicular, and/or none) may be used to collect images under different polarization conditions. Such simultaneous collection of multiple illumination conditions may be usefully employed in a "swipe" configuration. In such a configuration, a skin site is passed over a sensor with a rectangular or "one-dimensional" aspect ratio and a series of slit images are collected. These separate images may then be recombined on "stitched" back together to form a single composite two-dimensional image. Such recombination techniques may be applied to a multispectral sensor in which the different optical conditions are collected simultaneously or sufficiently close in time relative to the finger swipe speed.

The collected data are then used to perform a biometric function, such as an identification, identity verification, spoof detection, producing a composite fingerprint, or estimating a personal characteristic although other biometric functions may be performed in other embodiments. As indicated at block 614, multispectral analysis is performed on the data collected at blocks 606 and 612 to identify multispectral properties of the sample being imaged to compare it to anticipated properties of living human skin or, in some cases, to compare it to the anticipated multispectral properties of a specific person. For example, any of several types of discriminant techniques may be used to perform spectral comparisons (whereby spectral information is extracted from multispectral data by ignoring the spatial information while preserving the relationship of the optical properties observed across the different optical conditions), a number of which are described in detail in commonly assigned U.S. Pat. No. 6,560,352, entitled "Apparatus And Method Of Biometric Identification Or Verification Of Individuals Using Optical Spectroscopy," the entire disclosure of which is incorporated herein by reference for all purposes. For instance, suitable discriminant techniques may include techniques based on Mahalanobis distances, spectral residual magnitudes, K-nearest-neighbor models, and other linear or nonlinear discriminant techniques. Multispectral imaging techniques as described herein may provide information on external friction ridge patterns of the skin site, internal friction ridge patterns, composition and position of other subsurface structures, spectral qualities of the skin site, the size and shape of the skin site, the texture of the skin site, and other features and statistical qualities that are distinct between human skin and various artificial materials and spoofing methods.

In block 616, a composite fingerprint image may be extracted from the multispectral data using techniques described herein. In one instance a TIR image might be enhanced using the extracted fingerprint image generated from one or more direct images in order to improve the overall fingerprint image quality. In another instance, there may be a linear or nonlinear numerical relationship established on parts of the image where both the multispectral image data and the TIR data are well defined. These parts may then be used to establish a mathematical model such as with Principal Component Regression, Partial Least Squares, Neural Networks, or other methods known to those of skill in the art. The parts of the TIR image that are missing because of poor contact with the platen or other reasons can then be estimated from the model so established. In another embodiment, the two entire image sets may be used, but the numerical model built using robust statistics in which the relationship is relatively unaffected by missing or degraded portions of the TIR image. Alternatively, numerical models may be established through the examination of previously collected multispectral image sets and then applied to new data. Furthermore, while in many instances comparisons are performed over the images as a whole, in other instances more local characteristics may be used by confining the comparison to a defined portion of the images. In any case, the resulting composite image of purportedly improved quality may then be reported to a host system for further biometric processing. Such a compositing process to produce a single fingerprint image may enable the sensor to produce better defined fingerprints from multiple distinct images while still being compatible with systems designed to operate with conventional single-image data.

In block 618, the multispectral data may be processed to produce a biometric template. In one example, a set of fingerprint images or a single composite fingerprint image may be extracted from the multispectral data in the manner discussed. A template may then be generated for each fingerprint image by recording fingerprint minutia points or other methods known in the art. In the case that a template is extracted from each of a plurality of images collected under different optical conditions, the templates may be simply appended together, or they may be combined in such a way as to select those features that are common to multiple images while discriminating against those that spuriously appear in a small number of images (perhaps 1). Properties of the multispectral data other than the fingerprint data may be extracted to form a template that may be different from the fingerprint template or combined with the fingerprint template. Other such properties include locations of deeper blood vessels, salient surface and subsurface lines on the skin that arise from scarring and/or skin aging, skin texture for each optical condition and across optical conditions, overall spectral characteristics, overall finger size and shape.

In block 620, the multispectral data may be processed to produce estimates of various personal characteristics using various methods such as those described in previously incorporated U.S. Pat. No. 7,263,213. For example a neural network or other linear or nonlinear algorithm may be applied to the multispectral data to estimate age or gender of the person whose finger was measured. One form of neural network well suited to such estimation tasks is a Kohonen self-organizing map (SOM), which may be applied in an unsupervised mode or in a supervised mode, including learning vector quantization (LVQ) using techniques known to one familiar in the art.

Block 622 describes the archival of the raw multispectral data for later retrieval and processing. The data may be archived in the original form or compressed using either a loss or lossless compression algorithm. The multispectral data may also be preprocessed in some manner and the results of the preprocessing stored with or instead of the original data.

5. Spoof Detection

It has been noted above that embodiments of the invention have superior spoof-detection capabilities. In many instances, these capabilities derive from the sensitivity of the multispectral imaging to physiological features that are indicative of a living state of the object being imaged. In particular, it is possible to determine a "liveness" state of an object by ensuring spectral consistency with living material. While a system that identifies only fingerprints might be fooled by a simulated finger having a duplicate of an authorized fingerprint pattern, embodiments of the invention that use multispectral image data are capable of discriminating between such simulated structures and actual living structures.

In particular, skin is a complex organ made up of multiple layers, various mixtures of chemicals, and distinct structures such as hair follicles, sweat glands, and capillary beds. The outermost layer of skin, the epidermis, is supported by the underlying dermis and hypodermis. The epidermis itself may have five identified sublayers that include the stratum corneum, the stratum lucidum, the stratum granulosum, the stratum spinosum, and the stratum germinativum. Thus, for example, the skin below the top-most stratum corneum has some characteristics that relate to the surface topography, as well as some characteristics that change with depth into the skin. While the blood supply to skin exists in the dermal layer, the dermis has protrusions into the epidermis known as "dermal papillae," which bring the blood supply close to the surface via capillaries. In the volar surfaces of the fingers, this capillary structure follows the structure of the friction ridges on the surface. In other locations on the body, the structure of the capillary bed may be less ordered, but is still characteristic of the particular location and person. As well, the topography of the interface between the different layers of skin is quite complex and characteristic of the skin location and the person.

Figure 7:
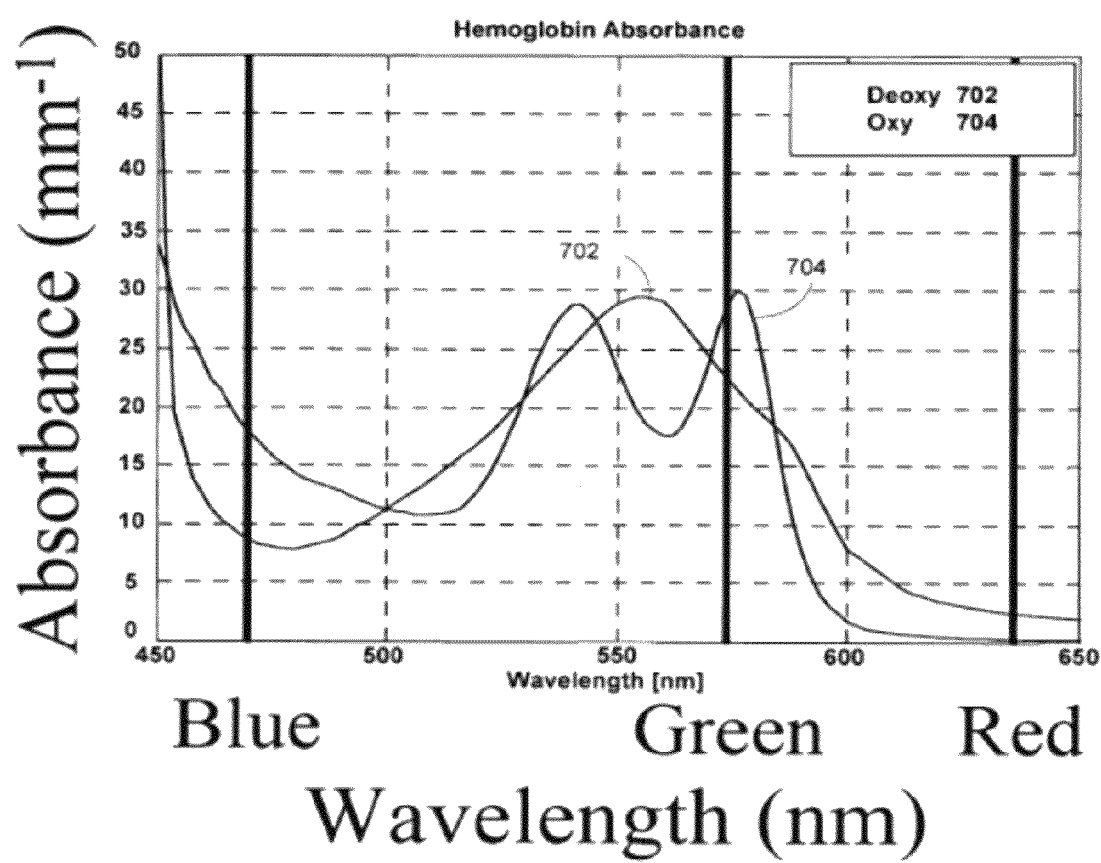
FIG. 7 is a graph showing the absorbance of hemoglobin at different light wavelengths.

Blood as distributed in the living tissue has distinct and strong absorbance bands in the visible region of light, as illustrated with the graph in FIG. 7. In this graph, the absorbance of hemoglobin at blood concentrations is shown for deoxygenated blood along curve 702 and for oxygenated blood along curve 704. Fortuitously, the visible wavelengths span an interesting region of the optical spectrum of blood, with the relationship of the red, green, and blue light being representative of spectrally active features in skin. A multispectral sensor may be used to make a static spectral reading of a sample, either when it touches the sensor surface or at a remote distance. In addition, the direct-imaging component of the sensor may illuminate the skin site as it moves to touch the sensor surface as well as during the time period immediately following the first contact between finger and sensor.

Information may be drawn from either or both of the static and dynamic phases to ensure that spectral qualities match those of living tissue. For example, during the dynamic phase, a change in blood distribution and/or color of the skin may be observed in the vicinity of the sensor as the skin blanches in response to pressure being applied to the skin site. In addition, areas of the skin may show a distinct pooling of blood, especially those regions at the perimeter of the area of contact between the finger and sensor. This blanching and/or pooling of blood provides an identifiable set of changes to the corresponding images. In particular, wavelengths less than approximately 580 nm, which are highly absorbed by the blood, are seen to get brighter in the region of blanching and darker in areas of blood pooling. Wavelengths longer than approximately 580 nm are seen to change much less during blanching and/or pooling. The presence, magnitude, and/or relative amounts of spectral changes that occur while the skin site touches the sensor can thus be used as an additional mechanism for discriminating between genuine measurements and attempts to spoof the sensor.

In embodiments where the sensor comprises both a direct imaging component and an TIR component, the pattern detected by the direct component using one or more illumination wavelengths and/or polarization conditions may be compared with the fingerprint pattern detected by the TIR component. In this way, internal fingerprint data due to blood and other subsurface structures is used to confirm the image of the external fingerprint that the TIR component collects. If there is a discrepancy between the two patterns, an attempt to spoof the sensor may be indicated and appropriate action taken. This method is especially sensitive to such spoof attempts as placing a thin, transparent film on a fingertip that has a different fingerprint pattern—while living tissue is still presented to the sensor, the difference in fingerprint patterns detected by the sensor nevertheless indicates a probable spoof attempt.

Other factors that can be monitored to discriminate between genuine tissue and attempts to spoof the sensor using an artificial or altered sample of some kind. For example, the difference in images taken under different polarization conditions will have certain characteristic properties for skin that will not be the same for some other types of materials. As another example, an image taken with one or more wavelengths may be monitored over time. During the specified time interval, changes such as those due to a pulse can be measured and used to confirm the genuineness of the tissue. As well, changes in the image that result from sweating at the ridge pores may be observed and used for spoof detection.

6. Composite Fingerprint Generation and Biometric Template Generation

Generally, there are one or more optical conditions that will produce a well-defined fingerprint image under most environmental and physiological conditions (assuming the finger being measured has well-defined fingerprint features). For example, in the case where the finger skin is moist and in good contact with the platen causing variable TIR effects across the platen, optical conditions that produce TIR imaging (i.e., optical conditions with an illumination angle greater than the critical angle and/or an imaging angle greater than the critical angle) would be expected to produce high-quality, high-contrast images. On the other hand, if the skin is particularly dry and/or not well coupled to the platen, direct imaging modes (i.e., illumination and imaging angles less than the critical angle) tend to produce higher quality fingerprint images. In addition the inventors have observed that different wavelengths will often define certain features (fingerprint patterns, scars) better than other wavelengths in certain portions of the image field and/or for certain fingers. Also, wavelengths less than approximately 580 nm tend to produce features that are "blotchy" due to being sensitive to blood distributions in the finger skin. However, the sensitivity to blood can produce good quality fingerprint patterns in certain cases. Conversely, wavelengths longer than approximately 580 nm tend to produce more homogeneous representations of the fingerprint and other features of the finger. The inventors have also observed that certain polarization conditions provide good fingerprint features only under certain conditions. For example, random polarization or parallel polarization configurations tend to show well defined surface features in those cases where the finger is not in good contact with the platen. Generally, however, the features produced by these polarization configurations are less well defined when there is good optical coupling between the finger and the platen. The cross-polarized configuration appears to be much less sensitive to such coupling variations.

Therefore, in order to produce a useable fingerprint biometric over a wide variety of conditions, the inventors find it useful to combine the fingerprint information from the plurality of optical conditions of the present invention in some way. For example, each of the images for a single illumination session taken under distinct optical conditions may be processed separately to enhance fingerprint patterns using bandpass filters, median filters, Fourier filtering, Gabor filters, histogram equalization, and other linear and nonlinear enhancement techniques known in the art. The resulting enhanced images may then be combined in some way such as taking a simple average of the images. Another technique is to assess the fingerprint quality of each of the images using standard-deviation metrics and other methods known in the art, and just average together those images with sufficient quality, or to perform a weighted average across the images where the weighting is proportional to quality, etc.

Another method that has been successfully used by the inventors is to pass each of the processed multispectral images separately into a minutia detection algorithm, which typically performs another set of operations including filtering and binarization of the images as part of the process to detect minutiae. These binary images may then be combined in some fashion such as averaging or producing a median binarized image. Alternatively, each of the images can be separately processed to produce minutiae and then the minutiae may be combined in some fashion. For example, all minutiae may simply be compiled together or some selection process may be applied to choose only those minutiae that are present on more than a certain number of image planes. Nearby minutiae across multiple image planes may be consolidated into a single minutia point.

In cases where the objective is to perform biometric matching rather than produce an image or a representation of an image such as a template, the templates produced from each of the image planes may be separately matched to the corresponding templates from another session. The resulting match values may then be combined in some way to produce a final match value on which a match/no-match decision may be made. For example, all of the individual match values may be averaged together, or only those match values generated from high-quality images may be averaged, or the median match value is used, or the highest or lowest is used, or a variety of other similar mathematical and logical operations may be applied.

The inventors have also found that it is possible to match multispectral images to images taken with other imaging technology. For example, each plane of a multispectral data set may be separately matched to an existing fingerprint image. The resulting collection of match values may then be combined in some manner (such as by calculating a mean, median, greatest value, or the like) to produce a single matching score that may then be used to perform a matching decision. In this manner, the multispectral data may be able to be used in conjunction with existing databases of non-multispectral fingerprint images taken with other optical sensors, capacitive sensors, thermal sensors, etc.

7. Applications

Figure 8:
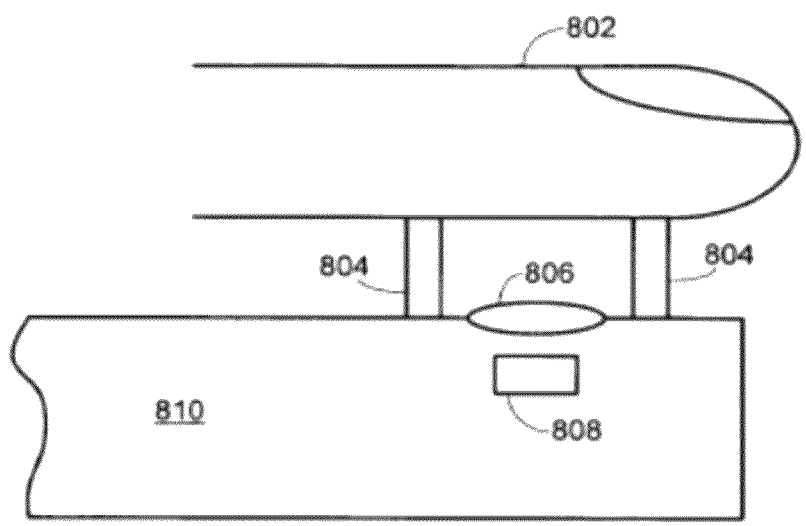
FIG. 8 provides a schematic illustration of integration of a multispectral biometric sensor with a portable electronic device according to embodiments of the invention.

In many embodiments, the multispectral sensor is incorporated into a portable electronic device. This is illustrated for one embodiment in FIG. 8, in which the portable electronic device is denoted 810. The portable electronic device 810 may be a cellular telephone, personal digital assistant, digital camera, laptop computer, or other portable electronic device in different embodiments. A light detector 808 such as described above in the form of a digital imaging array may be incorporated into the device 810 so that when the detector 808 is not being used to collect multispectral data, it may be used for conventional imaging of objects, places, and/or people, as is common practice. Illumination of tissue may be provided with a light source configured as an LED illumination ring 804 or may be provided as another type of illumination source, and imaging optics 806 are used as described in connection with FIG. 1. In certain embodiments, multispectral configurations similar to those shown in FIGS. 3A-3C may be incorporated into the device 810. In some of these embodiments, the configurations may be implemented in a swipe or strip-imaging configuration as described earlier. In other embodiments, the configurations may include a touch or area-imaging configuration.

Although the drawing shows the skin site 802 in contact with the sensor, other equivalent embodiments may be implemented in which the skin site is not in contact with the sensor. In some instances, the skin site may be located a remote distance from the sensor and the optical system of the sensor used to image the skin site at the appropriate distance.

In some embodiments, the sensor incorporated in a portable electronic device may contain an optical system that enables adjustable focus. The mechanism for adjusting the focus may include one or more lenses that may be moved into various positions. The focusing mechanism itself may be a conventional zoom arrangement. Alternatively, the mechanism for focusing may use a liquid lens based on the known phenomenon of electro-wetting. The focusing mechanism may comprise a MEMS micro-optical system or other similar focusing method. The focusing mechanism may comprise use of a wavefront coding method in which a phase distortion is introduced that facilitates a post-acquisition image correction for different focal positions.

In a system configuration in which the portable electronic device has been designed to accommodate a "close-up" or macro image of the skin site for biometric sensing, the same optical system may be used to read an optical code such as a barcode. Such a barcode reading could, for example, initiate a service in which product information for a product corresponding to the UPC barcode is downloaded to the portable device to provide the consumer with comparative pricing and performance data. Similar barcode scans may be used in other embodiments for promotional games or various gaming activities. The conjunction of a barcode scan taken in close temporal proximity to a biometric scan could provide an audit trail for legal matters, including financial documents and transactions, forensic chain-of-evidence scenarios, and a variety of logical and/or physical security applications.

An imaging system on a portable electronic device that is configured to collect multispectral biometric data may also be used to scan in text, graphics, or other printed matter. In the case of text, the scanned data may be converted to an interpretable form using known optical-character-recognition ("OCR") techniques. Such text recognition may then be used to provide input of text-translation services, copying services, and other such services that may be aided by a rapid and convenient character input.

An imaging system on a portable electronic device may also be used as an optical input device to provide a mechanism for securely inputting data into the device for functions such as reprogramming, security overrides, and secure digital communications. The illumination components of the imaging system may be used as optical output devices in the reverse direction from the detector elements. The use of multiple, filtered wavelengths can provide for multiple high-bandwidth channels for rapid and/or robust optical communication.

The multispectral sensor may also be used as a smart switch to turn on or enable an associated device, system, or service. In such a capacity, the multispectral sensor may be set to a video-streaming mode to collect several frames per second. Each frame may then be analyzed to detect motion and, if motion is detected, perform image-processing steps to confirm that the motion is due to a finger by analyzing the overall shape, the texture, and/or the spectral qualities relative to a living finger. When a finger has been confirmed, the smart switch function could, for example, turn a device on or off. If the motion could not be confirmed as coming from a finger, the sensor may simply resume monitoring.

The multispectral sensor may be used as a pointing device with similar functionality as a touchpad commonly used on a laptop PC. The multispectral sensor can be used in this fashion by monitoring the motion of the finger over the sensing area. Sliding the finger in a linear motion to the left can indicate a leftward motion to the PC (or cell phone, PDA, or other device), with similar effects for motions to the right, up, down, diagonal, or other directions. The cursor of the PC (or cell phone, PDA, or other device) may then be made to move in the indicated direction, or other appropriate action may be taken. In a similar fashion, the surface of the sensor may be tapped in different regions to simulate a click or double-click of a conventional PC mouse. Other motions, such as circles, X's, and the like, may be used to indicate other specific actions. In the case of touching or tapping the sensor, the degree of pressure may be estimated by evaluating the degree of blanching occurring in the skin site. In this manner, different actions may be taken in response to a soft pressure being sensed relative to a hard pressure.

The spectral qualities of the skin site in motion may be assessed to ensure that the detected motion is from that of a skin site rather than some spurious object. In this way, false motions can be avoided.

The sensor surface may also be used as a simple text entry device. In a similar fashion as in the case of a pointing device, the user may make motions with the fingertip that describe single letters or numbers, which are then accumulated by the portable electronic device.

A particular motion of the finger may be used to increase the security of the sensing system. In such a configuration, the spectral and spatial qualities of the finger are confirmed to match those that are on record while the particular finger motion that is made is assessed to ensure it is similar to the motion on record. In this way, both the finger qualities and the motion need to match in order to determine an overall match.

The multispectral sensor may be used to measure the ambient light condition. In order to do so, an image is taken without any illumination light turned on at a time when a skin site is not covering the sensor surface. The amount of ambient light may be determined from the image. Further details about ambient lighting may be derived in the case where the imager uses a color filter array or a similar mechanism to assess spectral characteristics of the light. The measured levels of ambient light may then be used by the associated device to set levels for display brightness, backlighting, etc. Such settings are particularly useful in ensuring the usability of portable electronic devices while conserving battery usage. The same ambient light information can also be used by the multispectral sensor to dynamically set gain, offset and other imaging parameters to best accommodate the current ambient lighting environment.

8. Tests

Figure 9A:
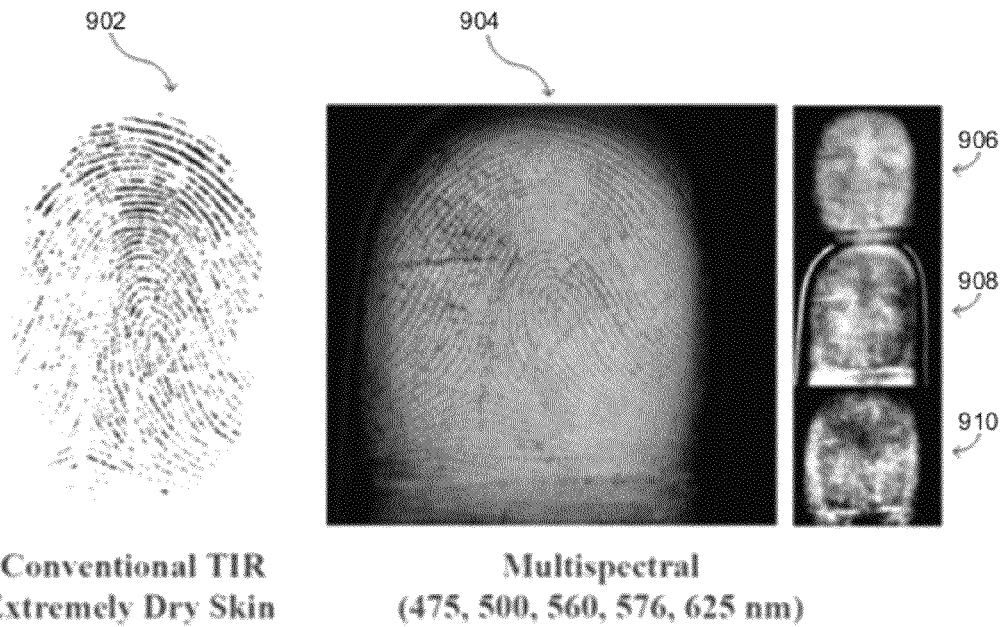
FIGS. 9A and 9B compare results of total-internal-reflectance and multispectral-imaging measurements of a fingertip under non-ideal conditions (COLOR).

A number of different experimental and simulation tests have been performed to illustrate the effectiveness of various aspects of the invention, including the ability to provide repeatable and reliable identity verifications and determinations. As an initial matter, the improvement in information collection by multispectral imaging over conventional TIR imaging is illustrated for different non-ideal conditions in FIGS. 9A and 9B. For example, FIG. 9A provides a comparison of a conventional TIR image in panel 602 taken from a fingertip having extremely dry skin. It is plainly evident that many features are lost from the image, making identity determinations and verifications more likely to be less reliable. In contrast, the direct image provided in panel 604 shows that features that are lost with a conventional TIR image may still be collected with the multispectral imaging techniques described herein. In this example, the direct image is generated using illumination at five different wavelengths, 475 nm, 500 nm, 560 nm, 576 nm, and 625 nm, with crossed linear polarization. The panels at the right respectively show a mapping of the first three principal components to red (panel 906), green (panel 908), and blue (panel 910).

Figure 9B:
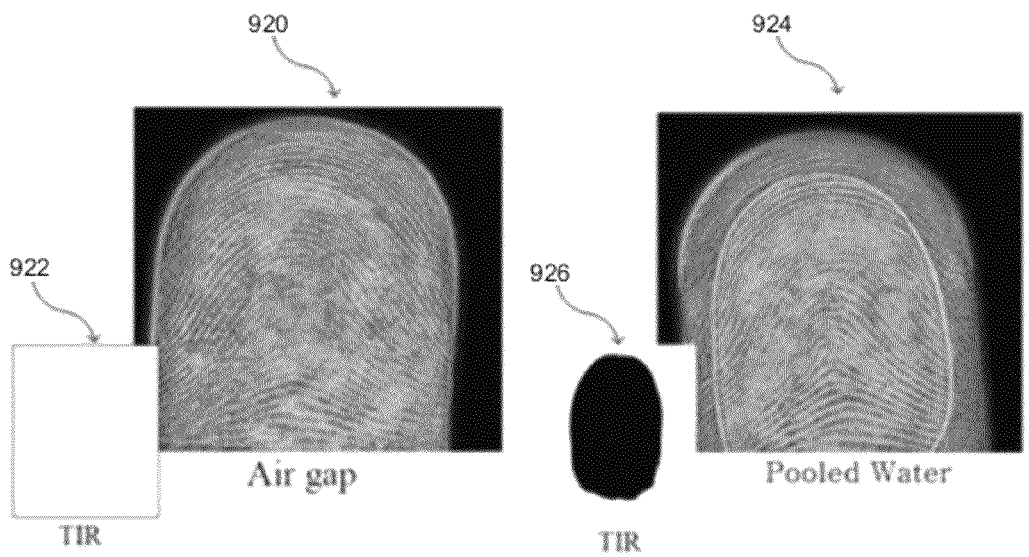

FIG. 9B shows the difference in results collected as a result of the presence of barrier materials between the skin site and the sensor for conventional TIR and for direct images. Panel 922 shows that the presence of an air gap when taking a conventional TIR image causes no information at all to be received because there is no frustration of the TIR. As seen in panel 920 for the same physical arrangement, the presence of an air gap does not significantly impair the collection of direct data. Conversely, the presence of pooled water causes a conventional TIR image to be swamped because the TIR is frustrated everywhere, resulting in a black image in panel 926 that conveys no useful information. This may also be contrasted with the direct image shown in panel 624 under the same physical circumstances, with no significant impairment of the collection of biometric information.

Figure 10B:
FIGS. 10A and 10B illustrate image characteristics with the presence of optically clear film.
Figure 10A:

FIG. 10 shows the effect of placing a thin, optically clear film on the finger, which in this experiment is simply transparent tape. FIG. 10A shows the resulting TIR image, which shows a blank region where the tape is. In contrast, FIG. 10B shows the average direct image that was observed in the same set of multispectral measurements. In this case the direct imaging used a cross-polarized configuration taken across multiple illumination wavelengths. As obvious from the figure, the resulting direct images are able to see the skin structure and other features that lie below a thin film.

The ability for multispectral imaging to discern different characteristics in tissue has also been tested with optical simulations. A nonsequential optical raytracing package (TracePro, version 3.2) was used in this way to perform initial tests of the characteristics of multispectral imaging as used in embodiments of the invention. For this illustration, the main components of the sensor included a light source, a glass platen, and an image plane arranged in a direct-imaging configuration. The illumination light was linearly polarized, uniform illumination with a specified wavelength. The platen was modeled as 1-mm-thick BK7 glass. The image plane was below the platen and viewed the sample through a crossed linear polarizer.

A 10×10 cm$^2$ tissue phantom was constructed of a 210-μm epidermis and a 4-mm dermis, which was chosen to make the dermis optically infinite in extent for the simulation. The phantom incorporated various structures filled with blood. In particular, a series of 100×100 μm$^2$ vessels were placed at a spacing of 500 μm and a depth of 150 μm to simulate the capillary structure below the friction ridges. Also, several deeper blood-filled regions were created and positioned in the dermis to assess the ability of the system to detect and image such structures. The optical parameters for epidermis, dermis, and blood were taken from V. Tuchin, Tissue Optics (SPIE 2000), Chap. 1, the entire disclosure of which is incorporated herein by reference for all purposes.

In addition to the components of tissue, various characteristics of the optical interface with the sensor were also tested. One quadrant of the tissue cube included an external topography that followed the lines of the underlying capillaries, to simulate a well-defined set of friction ridges in contact with the sensor. The three remaining quadrants of the tissue cube were flat, with no external features, simulating a worn or missing fingerprint pattern. Finally, one half of one of the flat quadrants had a 25-μm air gap between the sensor and the external surface of the tissue cube to quantify the effect of no optical contact between the skin and sensor.

Figure 11A:
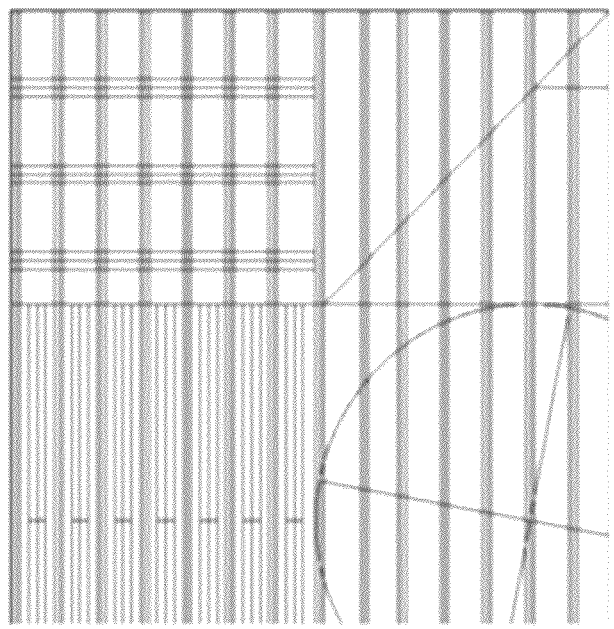
FIG. 11A provides a top view of a tissue phantom used is simulations for demonstrating certain aspects of the invention.

A top view of the tissue phantom is shown in FIG. 11A. The vertical lines across the entire cube correspond to the capillaries. The denser array of lines in the lower left quadrant correspond to the portion of the phantom that has external ridge structure. The horizontal lines in the upper left quadrant as well as the circular structure in the lower quadrant demarks the segment of the quadrant in contact with the platen (upper triangle) from that with an air gap (lower triangle).

Figure 11B:
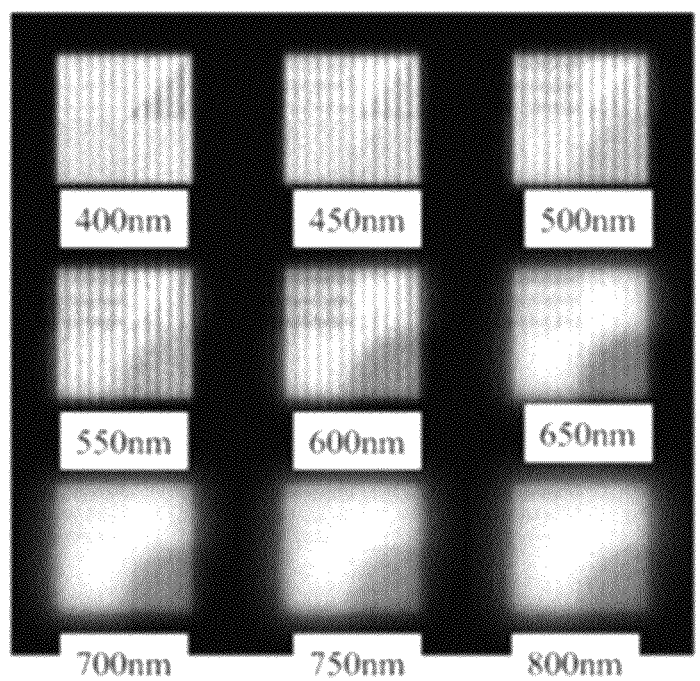
FIG. 11B provides examples of multispectral images at different wavelengths for the skin phantom shown in FIG. 11A.

A variety of optical simulations were run over various illumination wavelengths in the visible and very near infrared spectral regions. Optical simulations were performed by tracing 4 million rays per wavelength distributed uniformly over a 6 mm×6 mm region centered on the tissue phantom. In general, the optical simulations produced images that clearly showed the internal structures of the skin phantom. An example of such a set of simulated images is shown in FIG. 11B for wavelengths that vary from 400 nm to 800 nm in 50-nm increments. The type, depth, and resolution of the structures in each of the images clearly depends on the illumination wavelength. In addition, it is notable that the presence of the internal structures in the images are relatively unaffected by the presence or absence of external skin features, as well as whether the skin was in optical contact with the platen or not.

Figure 12A:
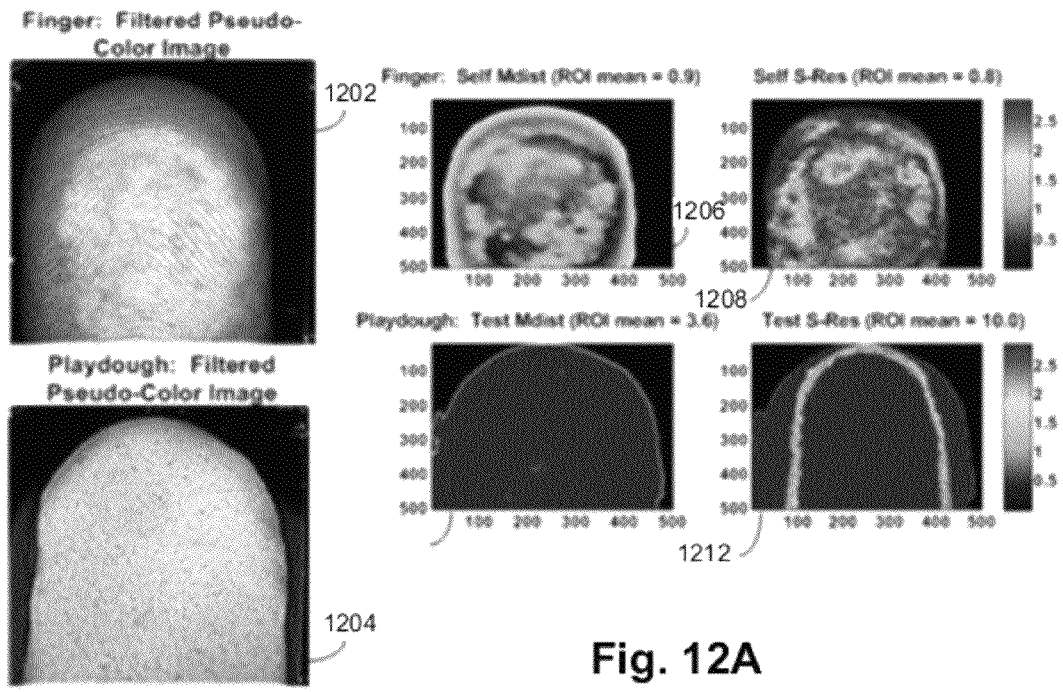
FIGS. 12A and 12B provide results of multispectral images taken for illustrative spoof samples (COLOR).

Spoof detection has been tested by the inventors with a number of different imitations and illustrate the ability of the multispectral sensing configurations to discriminate between living tissue and a nonliving imitation to perform a liveness assessment. Some of the results of such spoof-detection tests are presented in FIGS. 12A-13; some additional results are presented in previously incorporated U.S. Provisional Patent Application No. 60/610,802. FIG. 12A provides for a static spectral test comparing measurements of an actual fingertip with measurements performed on a playdough imitation constructed by the inventors. Panel 1202 provides a filtered pseudocolor image of the actual fingertip, which may be compared with the corresponding image of the playdough imitation in panel 1204.

The results of multispectral imaging comparisons are shown in panels 1206-1212. Panels 1206 and 1208 respectively show the results of Mahalanobis distance and spectral residual calculations for the actual fingertip. These may be compared with panels 1210 and 1212, which show corresponding results for the playdough imitation. It is evident from the results that the playdough imitation lacks multispectral characteristics present in the results for the actual fingertip, providing a basis for a liveness discrimination.

Figure 12B:
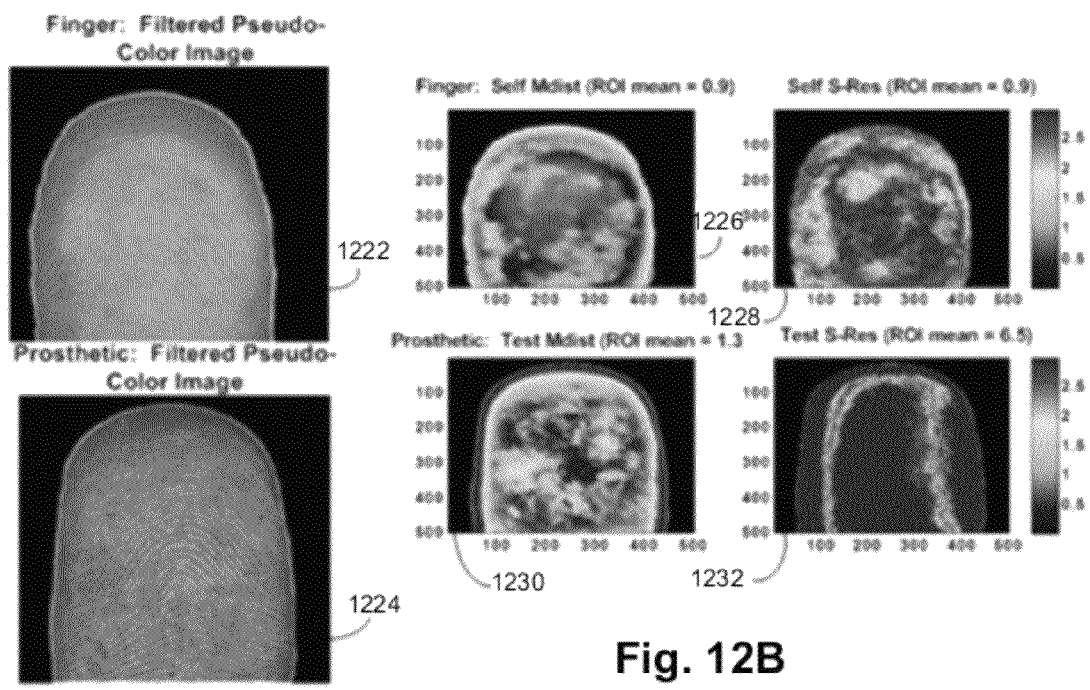

More impressive results are provided in FIG. 12B, which shows a similar array of panels for tests performed with a living fingertip and with an ultrarealistic prosthetic fingertip whose construction was commissioned by the inventors. The prosthetic fingertip was made of a multilayer silicone structure, cast on a real and available finger, and colored to match the coloring of the real finger. Fine detail was included on the prosthetic, including the fine detail of fingerprints. It is apparent from the filtered pseudo-color images of the actual finger and prosthetic shown respectively in panels 1222 and 1224 that it is difficult to discern which is the spoof imitation. This determination is, however, notably in contrast with the multispectral results shown in panels 1226-1232, with panels 1226 and 1228 respectively showing results of Mahalanobis distance and spectral residual calculations for the actual finger, and panels 1230 and 1232 respectively showing corresponding results for the prosthetic. Characteristic circumferential optical structure is evident in the Mahalanobis distance results that indicates lack of a liveness state for the prosthetic in panel 1230; this determination is even more pronounced with the spectral residual results shown in panel 1232 to be similar to those for the playdough imitation in panel 1212 of FIG. 12A.

Figure 13:
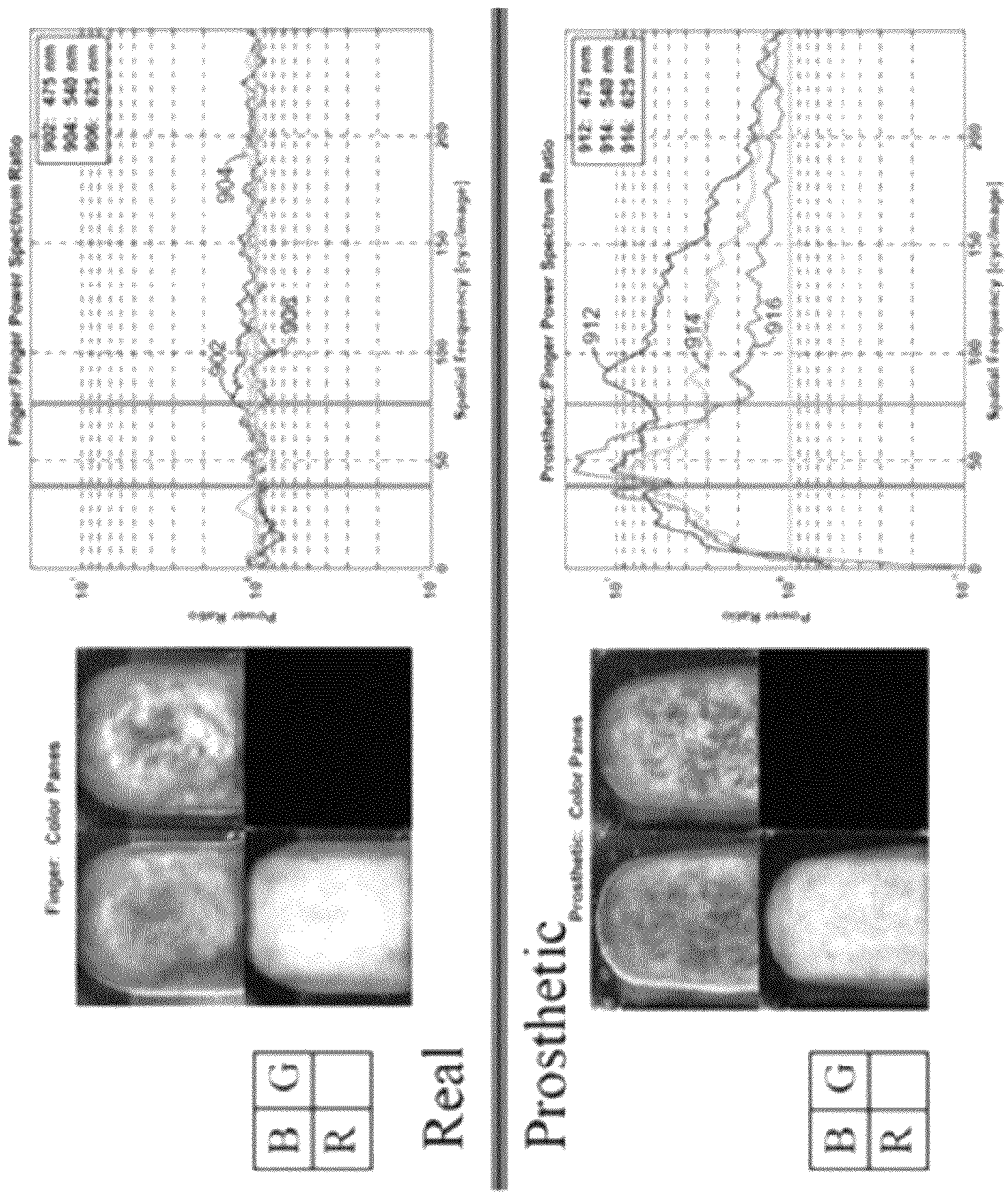
FIG. 13 provides a comparison of multispectral images taken for living and prosthetic fingers to illustrate spoof detection (COLOR).

A chromatic texture comparison is shown in FIG. 13 for the real finger and prosthetic. In each instance chromatic texture was analyzed by separating blue, green, and red contributions at 475 nm, 540 nm, and 625 nm. Color panes are shown in the left portion of the drawing and a power spectrum ratio for each chromatic contribution is shown in the right portion of the drawing. For the actual finger, a finger:finger power spectrum ratio is shown for the blue contribution 1302, the green contribution 1304, and the red contribution 1306. Similarly, for the prosthetic, a prosthetic:finger power spectrum ratio is shown for the blue contribution 1312, the green contribution 1314, and the red contribution 1316. These results demonstrate that significantly more power is provided in the prosthetic spatial frequencies than in the actual fingertip, particularly for blue illumination at higher spatial frequencies. Such a distinction enables the liveness-state determination to be made, and therefore for a spoof detection to be made.

A multiperson study was also conducted by the inventors, with study data being collected over a period of approximately sixteen days on fifteen adults using a two-camera system similar to FIG. 5. The nine male and six female participants ranged in age from 20 to 50 years (mean=37.4 years). All were office workers with no health issues or other notable attributes. The data were collected in New Mexico during the winter period in which the atmospheric conditions were relatively dry. A total of 602 multispectral datasets were collected, with three or four images being collected from participants during each visit on each of four fingers (left index, left middle, right index, and right middle).

Direct images were preprocessed by blurring each image wavelength plane with a Gaussian filter of sufficient width to remove the fingerprint features. This smooth image was then used as the divisor for ratioing to the original image on a pixel-by-pixel basis, a process that acted primarily to remove effects of nonuniform illumination across the platen. The resulting image for each plane was then bandpass-filtered using a linear filter with a normalized passband of 0.15-0.35, which corresponds to real spatial frequencies of about 1.5-3.4 cycles/mm. This bandpass operation suppressed out-of-band variation, especially pixel-to-pixel noise) while passing frequencies useful for fingerprint features. An adaptive histogram equalization was performed to equalize the fingerprint contrast over the image plane.

The analysis of biometric performance was produced by performing a one-to-one match between pairs of fingerprint measurements. Each of the 602 sets of images was matched to all of the other images collected on the same finger ("genuine matches"). The same number of randomly selected non-matching images was also compared to each of the chosen images ("imposters"). This resulted in a total of 6,056 comparisons being made for both genuine matches and imposter matches. In the case of genuine matches, no provision was made for eliminating pairs of images that differed only in the matching order so that the effective number of independent matches was 3,028.

Biometric processing of the TIR data was straightforward since it provided only a single image per measurement. The direct data, after the preprocessing described above, were processed to extract minutiae from each of six image planes corresponding to different illumination conditions (cross-polarized 445, 500, 574, 610, and 660 nm; and nonpolarized 640 nm) and matched against the corresponding direct image plane of a second measurement. The match values from each of the six image planes were averaged to provide a final direct image score.

Figure 14A:
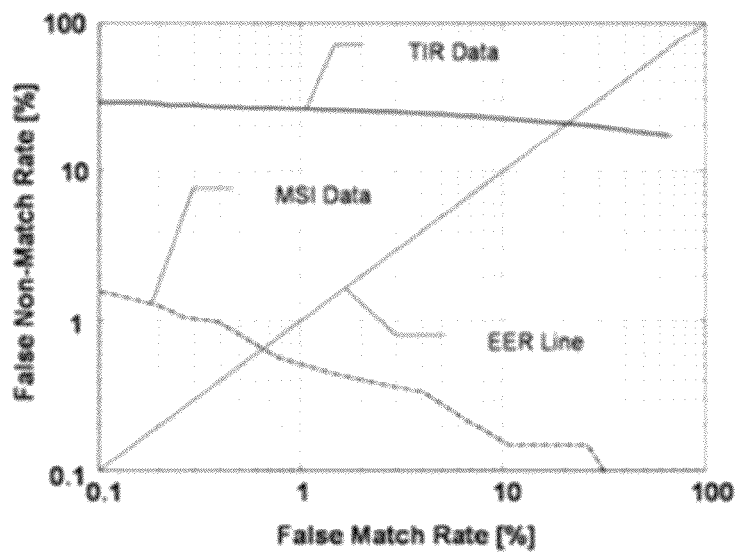
FIGS. 14A-14D show results of a multiperson study conducted to evaluate the use of multispectral imaging data in providing complementary information to improve fingerprint biometric performance.

FIG. 14A shows the receiver operating characteristic ("ROC") curves for the TRI data and for the combined direct ("MSI") data. The ROC curve shows the relationship between the false nonmatch rate ("FNMR") to the false match rate ("FMR") in percentage units. The equal-error rate ("EER"), which is the point on the curve where the FNMR equals the FMR, is seen to be quite elevated for the TIR data (~20%) while the EER for the combined direct data is much lower (~0.7%). Based on 3,028 independent comparisons and binomial statistics, the 95% confidence intervals for these two performance metrics are [18.8%, 21.6%] and [0.4%, 1.0%] respectively. The differences of these performance estimates are therefore statistically significant.

Figure 14B:
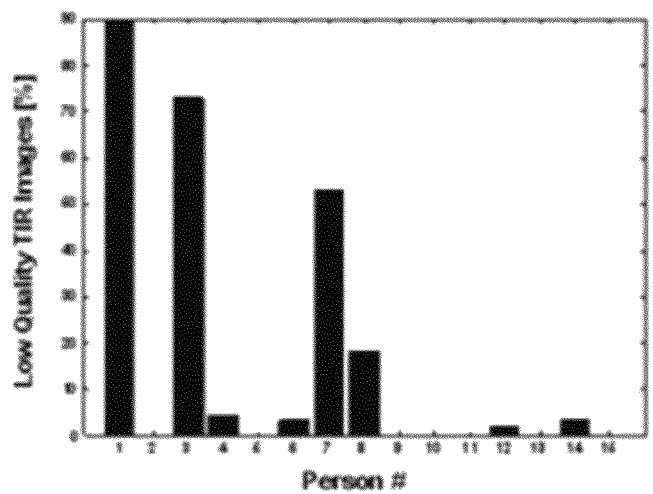

The TIR error is dominated by poor-quality images due to prints such as those shown in the left panel of FIG. 9A. The fingerprint software used for this investigation provides a low-quality warning indicator for such cases. A total of 122 TIR prints were designated as low image quality by the fingerprint software, which corresponds to 20.3% of all TIR data collected. Further investigation showed that the TIR image quality problems were related to certain study participants, as illustrated in FIG. 14B. This figure plots the fraction of each participant's TIR mages that were designated as low image quality, which was as large as 90% for one subject. It is clear that certain participants (i.e., numbers 1, 3, 7, and 8) were responsible for a majority of the poor TIR images. A visual examination of the fingers of participants with the largest rates of low-quality TIR images indicated that these people's skin was notably dry.

Figure 14C:
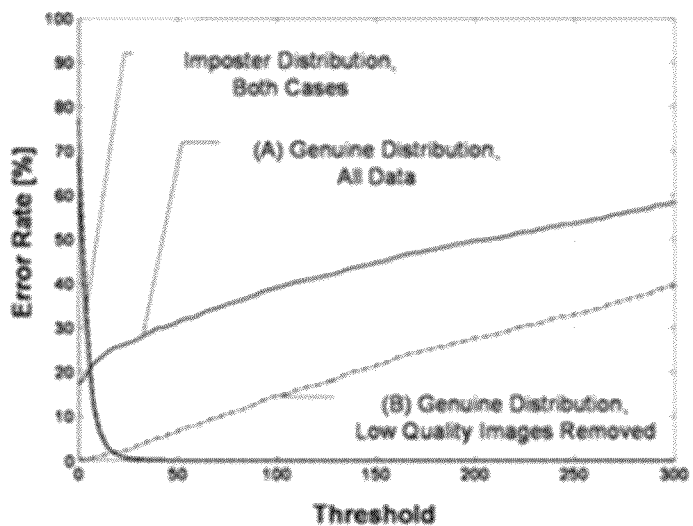

The effect of the low-quality TIR images on the resulting biometric performance can be seen in FIG. 14C, which shows the distributions of the match values for both genuine and imposter comparisons. These distributions are shown for two cases. Case A includes all TIR images, as were used to generate the TIR curve in FIG. 14A. Case B was reanalyzed to remove all instances in which one or both of the images being matched is designated as low quality. By removing 20.3% of the TIR data, the performance of the remaining data improved from an EER of approximately 20% to 1.8%. The figure shows clearly that removing the low-quality TIR images results in a significant improvement in the distribution of the genuine match values, the distribution of the imposter match values changes imperceptibly. None of the direct-image data used to generate the corresponding performance curve in FIG. 14A was designated as low-image quality by the fingerprint software.

Figure 14D:
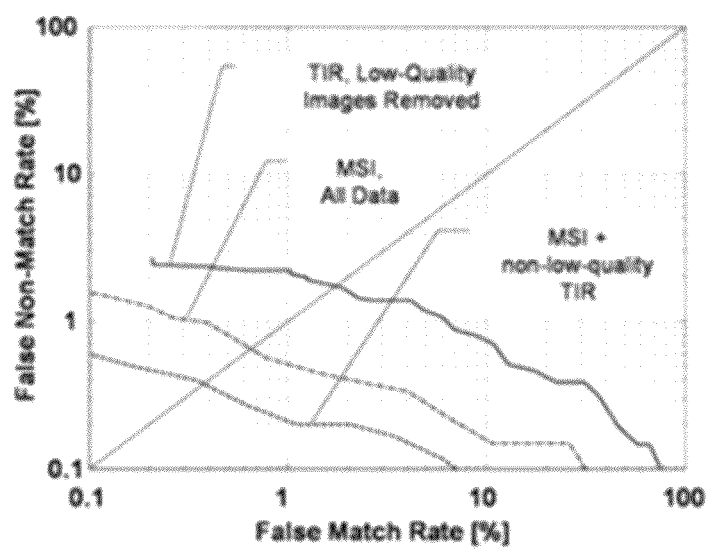

For samples in which the corresponding TIR image was not designated as low quality, the TIR matching score was averaged together with the individual multispectral scores to produce a composite match value. In cases where the TIR image was designated as low quality, the composite match value was generated from just the individual multispectral scores, as before. Performing this procedure on the entire dataset yields the ROC curve shown in FIG. 14D. There is clear improvement of the direct+TIR data (EER ~0.4%) versus the multispectral data alone (~0.7%).

The results of this study indicate that multispectral sensors as described herein are able to collect images from which useful fingerprint information can be extracted. Moreover, common effects that severely affect a conventional TIR sensor have little or no effect on a multispectral sensor. This result, particularly when combined with the result described above of using multispectral imaging as a powerful liveness detector, demonstrates a number of useful features of embodiments of the invention over the prior art.

9. Example

A specific example of a structure that incorporates a sensor as described herein for an embodiment is described in connection with FIGS. 15A-15D. In this embodiment, the sensor is comprised by a turnstile having the general structure shown in FIG. 15A, the turnstile being of the type that may be used to control access by people to different areas in an amusement park, sports arena, or the like. The different areas between which the turnstile controls access are denoted as a "paid area" and a "free area" in FIG. 15A. Access is controlled with a dropping-arm tripod obstacle 1502. The biometric sensor 1504 may be mounted on the top surface of the turnstile housing.

Figure 15A:
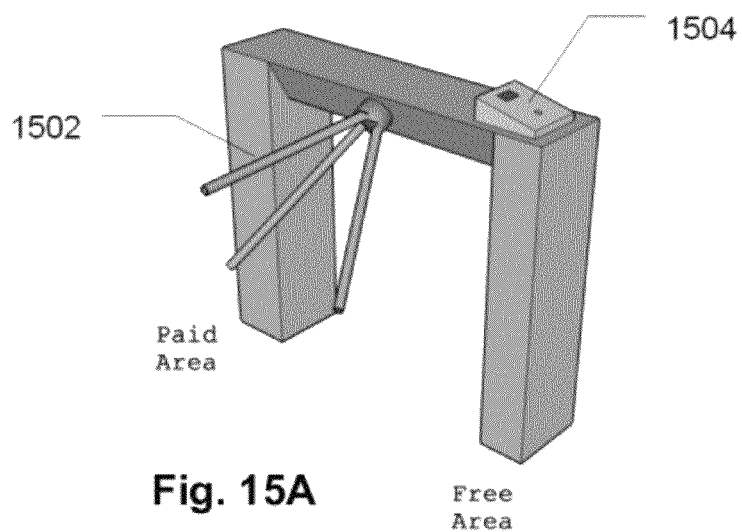
FIGS. 15A-15D illustrate an exemplary embodiment in which a sensor is integrated with a turnstile.
Figure 15B:
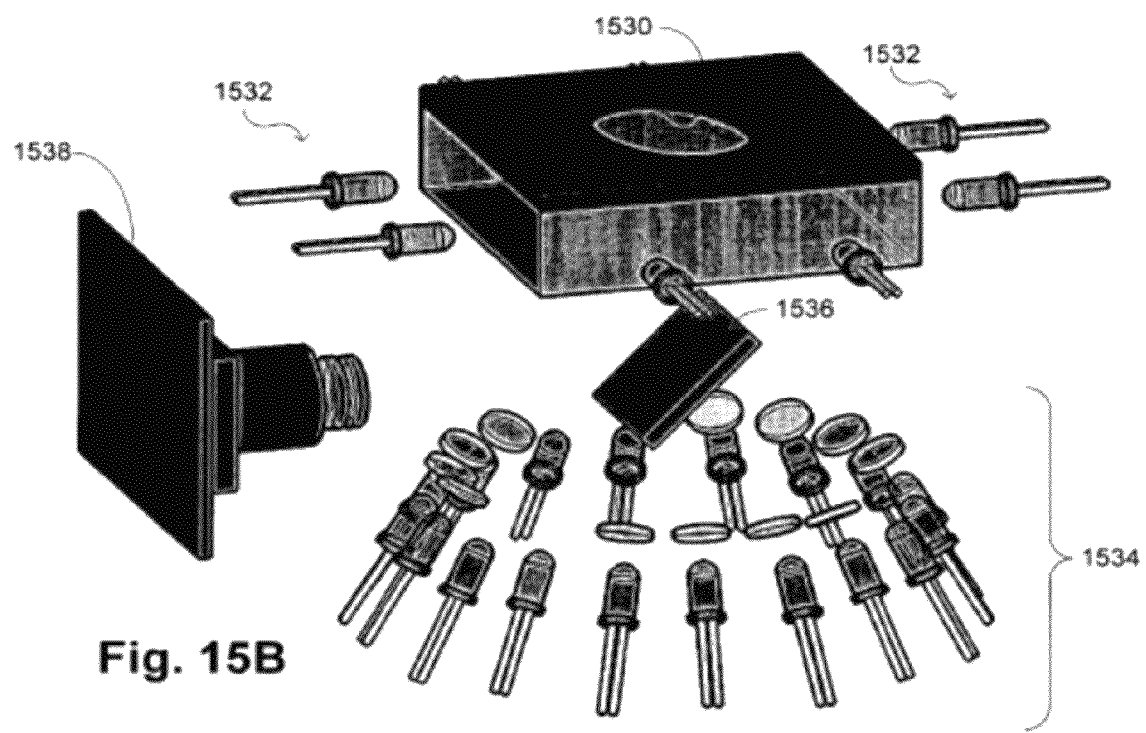

A specific structure for the biometric sensor is shown in FIG. 15B, with imaging taking place over a platen 1530 having an ergonomic cover plate; the back of the ergonomic cover plate may act as an optical reference. Direct illumination is provided by illumination sources 1534, some of which include polarizers and others of which do not include polarizers. TIR-image illumination is provided by illumination sources 1532. No polarizers are used with the TIR illumination sources. Light is directed to an imager 1538 after encountering the tissue by a turning mirror 1536. The imager includes a short-wavelength pass filter and a polarizer that may be parallel or perpendicular to direct illumination.

Figure 15C:
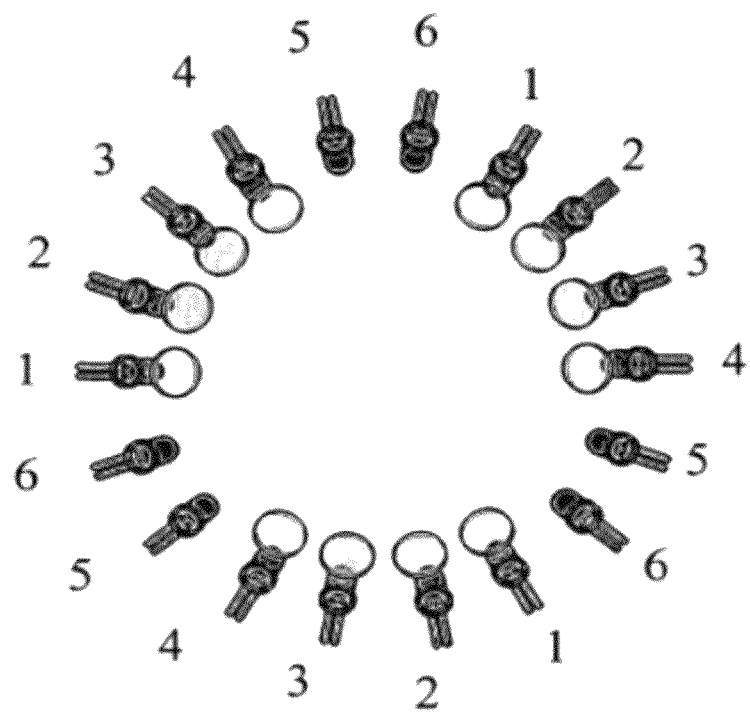

In this example, the direct illumination is provided by 18 LEDs made up of two colors and either with or without polarizers. An arrangement for the 18 LEDs is shown in FIG. 15C, with half of the illumination sources providing green light and half of the illumination sources providing blue light. For convenience, the illumination sources are numbered to define six different banks, with banks "1" and "3" providing blue polarized light, banks "2" and "4" providing green polarized light, bank "5" providing blue unpolarized light, and bank "6" providing green unpolarized light. In this example, the polarizers are linear polarizers and are uniformly aligned.

Figure 15D:
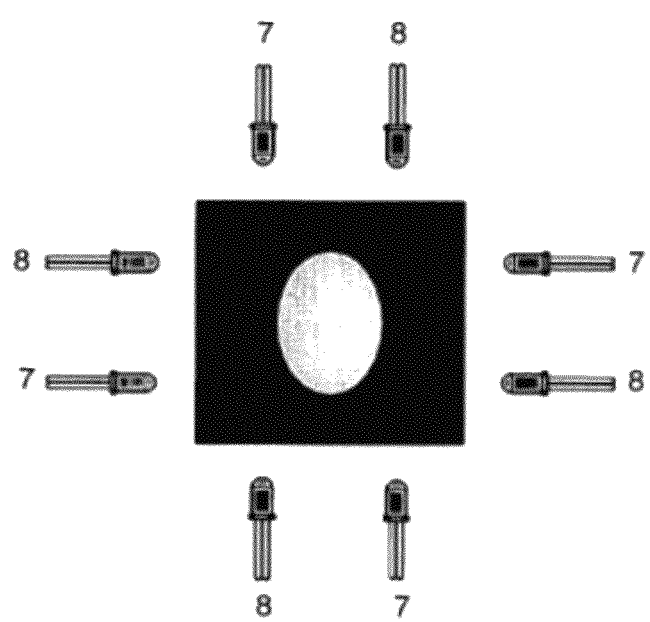

The TIR illumination sources are shown in FIG. 15D having 8 LEDs made up of two colors without any polarization. These LEDs may also be controlled as two separate banks, with bank "7" providing blue unpolarized light and bank "8" providing green unpolarized light.

This arrangement may allow an image sequence to be collected with seven frames: (1) ambient; (2) blue TIR with bank "7"; (3) green TIR with bank "8"; (4) polarized blue direct with banks "1" and "3"; (5) polarized green direct with banks "2" and "4"; (6) unpolarized blue direct with bank "5"; and (7) unpolarized green direct with bank "6." The image sequence may be collected in this order or in a different order over a period of time on the order of milliseconds. The turnstile may thus be configured to perform a biometric assessment of persons attempting to move from one access area to another using the methods described in detail above.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A biometric measurement system comprising:
   a platen;
   a thin film;
   an illumination source disposed to illuminate a skin site positioned over the platen in a configuration in which the thin film is disposed between the platen and the skin site;
   an imaging system disposed to receive light scattered from the skin site; and
   a controller interfaced with the illumination source and the imaging system, the controller including:
      instructions to illuminate the skin site through the thin film under a plurality of distinct optical conditions during a single illumination session;
      instructions to derive an image of the skin site from light received by the imaging system with direct imaging according to the distinct optical conditions; and
      instructions to perform a biometric function with the derived image.

2. The biometric measurement system recited in claim 1 wherein the plurality of distinct optical conditions comprise a plurality of different wavelengths of light emitted by the illumination source.

3. The biometric measurement system recited in claim 1 wherein the plurality of distinct optical conditions comprise a plurality of different illumination angles at which light emitted by the illumination source is directed to the skin site.

4. The biometric measurement system recited in claim 1 further comprising:
   a first polarizer disposed to polarize light emitted by the illumination source;
   a second polarizer disposed to polarize light received by the imaging system,
   wherein the plurality of distinct optical conditions comprise distinct relative polarization conditions.

5. The biometric measurement system recited in claim 1 wherein the thin film is optically clear at a wavelength of light emitted by the illumination source.

6. The biometric measurement system recited in claim 1 wherein the thin film is positioned on the skin site.

7. The biometric measurement system recited in claim 1 wherein the instructions to illuminate the skin site through the thin film under a plurality of distinct optical conditions comprise instructions to illuminate the skin site under the plurality of distinct optical conditions sequentially.

8. The biometric measurement system recited in claim 1 wherein the instructions to illuminate the skin site through the film under a plurality of distinct optical conditions comprises instructions to illuminate the skin site further under imaging conditions substantially affected by total internal reflectance.

9. The biometric measurement system recited in claim 1 wherein the skin site is separated from the platen by a volume of an external environment.

10. The biometric measurement system recited in claim 1 wherein the thin film includes an adhesive.

11. A method of performing a biometric measurement on an individual, the method comprising:
    illuminating a skin site of the individual under a plurality of distinct optical conditions, wherein the skin site is positioned over a platen in a configuration in which a thin film is disposed between the platen and the skin site;
    receiving light scattered from the skin site with an imaging system using direct imaging;
    deriving an image of the skin site from the received light according to the distinct optical conditions; and
    performing a biometric function with the derived image.

12. The method recited in claim 11 wherein the plurality of distinct optical conditions comprise a plurality of different wavelengths of light.

13. The method recited in claim 11 wherein the plurality of distinct optical conditions comprise a plurality of different illumination angles at which light is directed to the skin site.

14. The method recited in claim 11 wherein the plurality of distinct optical conditions comprise a plurality of distinct polarization conditions.

15. The method recited in claim 11 wherein the thin film is optically clear at a wavelength of light illuminating the skin site.

16. The method recited in claim 11 wherein the thin film is positioned on the skin site.

17. The method recited in claim 11 wherein illuminating the skin site of the individual under the plurality of distinct optical conditions is performed sequentially.

18. The method recited in claim 11 wherein illuminating the skin site of the individual is further performed under imaging conditions substantially affected by total internal reflectance.

19. The method recited in claim 11 wherein the skin site is separated from the platen by a volume of an external environment.

20. The method recited in claim 11 wherein the thin film includes an adhesive.

* * * * *